United States Patent [19]

Sandner et al.

[11] 4,049,931
[45] Sept. 20, 1977

[54] CATALYST SYSTEMS CONTAINING DIMETHYLAMINO ETHER MONO-OLS FOR POLYURETHANE FOAM FORMATION

[75] Inventors: Michael Ray Sandner, Chappaqua, N.Y.; Robert Donovan Duffy, Summersville, W. Va.

[73] Assignee: Union Carbide Corporation, New York, N.Y.

[21] Appl. No.: 581,745

[22] Filed: May 29, 1975

[51] Int. Cl.$^2$ .................. B01J 27/24; B01J 31/12; C08G 18/18

[52] U.S. Cl. .................. 260/2.5 AC; 252/431 R; 252/438; 260/2.5 AQ; 260/75 VC; 260/77.5 AC; 260/77.5 MA

[58] Field of Search .................. 260/2.5 AC, 2.5 AQ, 260/75 NC, 77.5 AC, 77.5 MA; 252/43 R, 438

[56] References Cited

U.S. PATENT DOCUMENTS

| | | | |
|---|---|---|---|
| 2,941,967 | 6/1960 | Moller et al. | 260/2.5 |
| 3,341,482 | 9/1967 | Gmitter et al. | 260/2.5 |
| 3,478,096 | 11/1969 | Cyba | 260/563 |
| 3,520,835 | 7/1970 | Chandley et al. | 260/2.5 |
| 3,573,255 | 3/1971 | Cyba | 260/47 |
| 3,853,818 | 12/1974 | Bechara et al. | 260/75 NC |
| 3,890,255 | 6/1975 | van Leuwen et al. | 260/2.5 AQ |
| 3,899,443 | 8/1975 | Reymore et al. | 260/2.5 AC |
| 3,931,387 | 1/1976 | Hostettler | 260/75 NC |

FOREIGN PATENT DOCUMENTS 1,166,742  10/1969  United Kingdom

OTHER PUBLICATIONS van der Stelt et al. — Chem. Abs. 63, 6899d (1965).

*Primary Examiner*—Donald E. Czaja
*Assistant Examiner*—H. H. Fletcher
*Attorney, Agent, or Firm*—Marylin Klosty

[57] ABSTRACT

Cellular urethane polymers are provided by effecting the reaction of an organic polyol reactant comprising a polyether polyol and an organic polyisocyanate reactant in the presence of a blowing agent and a catalyst system comprising a tertiary-dimethylamino ether mono-ol. In the dimethylamino ether mono-ols employed as catalysts in the practice of the invention, the tertiary-dimethylamino group and the hydroxyl group are positioned beta to a common acyclic ether oxygen atom or to different acyclic ether oxygen atoms which in turn are positioned beta to one another. The said dimethylamino ether mono-ols are versatile, low odor catalysts and are useful in forming cellular urethane polymers ranging from all water-blown flexible polyether foam to all fluorocarbon-blown rigid foam including semi-flexible and high-resilience foam products. Especially preferred for use in the practice of the invention are 2-(2-dimethylaminoethoxy)ethanol and 2-[2-(2-dimethylaminoethoxy)ethoxy]ethanol either as such or in combination with other catalysts including other tertiary-amine components and/or organic compounds of tin. Also provided are blended catalyst systems comprising said dimethylamino ether mono-ols.

50 Claims, No Drawings

CATALYST SYSTEMS CONTAINING DIMETHYLAMINO ETHER MONO-OLS FOR POLYURETHANE FOAM FORMATION

BACKGROUND OF THE INVENTION

This invention pertains to the use of a particular class of tertiary-amino ether mono-ols as catalysts in the formation of cellular urethane polymers by the reaction of organic polyisocyanates and active hydrogen-containing compounds in the presence of a blowing agent. The invention also relates to particular blended catalysts comprising the said tertiary-amino ether mono-ols including the use thereof for polyurethane foam formation.

It is well known to the art that cellular urethane polymers are provided by the reaction of organic polyisocyanates and active hydrogen-containing organic compounds such as in particular organic polyols, in the presence of a source of blowing action and one or more activators. It is also known that a number of different chemical reactions occur during polymer formation and expansion. For example, in addition to the chain-extending, urethane-forming reaction between free isocyanate groups and active hydrogen, initially formed urethane linkages bearing secondary hydrogen may also function as a source of active hydrogen and react with additional isocyanate to form cross-links between polymer chains. Further, in systems wherein the blowing agent comprises water such as, for example, flexible, semiflexible and many rigid formulations, isocyanate is also consumed by reaction with water, thereby generating carbon dioxide blowing agent in situ, and introducing further cross-links comprising urea groups. The nature of the cellular structure and the physical and mechanical properties of the foam are influenced by the extent of such reactions, and the relative rates and point in time at which they occur. Although balancing these variables so as to achieve a particular type or grade of foam can be controlled to some extent by the functionality, molecular weight and other structural features of the polyisocyanate and active hydrogencontaining reactants, the catalyst system also plays a significant role in this respect.

Among the types of compounds that have achieved long-standing widespread commercial application as catalysts in polyurethane foam manufacture are: tertiary-amines consisting of carbon, hydrogen and amino nitrogen, as typically illustrated by 1,4-diazabicyclo[2.2.2]octane ("triethylenediamine"), N,N,N',N'-tetramethyl-1,3,-butanediamine and N,N-dimethylcyclohexylamine; tertiary-amines consisting of carbon, hydrogen, amino nitrogen and oxygen wherein oxygen is present as ether oxygen, as typically illustrated by bis[2-(N,N-dimethylamino)ethyl]ether and N-ethylmorpholine; and tertiary-amines consisting of carbon, hydrogen and oxygen wherein oxygen is present as hydroxyl as typically illustrated by N,N-dimethylethanolamine.

More recent advances in cellular urethane manufacture include the utilization of low odor tertiary-amines consisting of carbon, hydrogen, amino nitrogen and oxygen where oxygen is present as carbonyl of either a carboxylate or dimethylamido group, as described and claimed in U.S. Pat. No. 3,821,131, granted June 28, 1974. An especially effective catalyst of this latter type is 3-dimethylamino-N,N-dimethylpropionamide. Another relatively recent advance in the catalysis of cellular urethane manufacture is the use of amine catalyst systems comprising 3-dimethylaminopropionitrile which is also a low odor catalyst. This particular advance is described and claimed in copending application Ser. No. 369,556, filed June 13, 1973, of Walter R. Rosemund, Michael R. Sandner ad David J. Trecker, now U.S. Pat. No. 3,925,268.

From the standpoint of catalytic activity for the $H_2O$/-NCO reaction, the more potent of the aforementioned specific amines are triethylenediamine and bis[2-(N,N-dimethylamino)ethyl]ether. Such catalysts, which are also relatively expensive, are usually supplied and utilized in dilute form as solutions in catalytically inactive diluents such as glycols. Illustrative of such diluents are diethylene glycol and dipropylene glycol.

Of the aforementioned amines, one of the least expensive to manufacture is N,N-dimethylethanolamine ("DMEA") which is readily prepared as the 1:1 molar adduct of dimethylamine and ethylene oxide. Another attractive feature of DMEA is that it is less odorous than many other conventional amines such as N-ethylmorpholine, and those consisting of carbon, hydrogen and amino nitrogen such as, in particular, triethylenediamine and N,N,N',N'-tetramethyl-1,3-butanediamine. Relative to triethylenediamine and bis[2-(N,N-dimethylamino)ethyl]ether, DMEA exhibits moderate activity as a catalyst for water-blown, flexible slabstock. It is often necessary, therefore, in its use in the manufacture of conventional flexible slabstock, to employ DMEA at enhanced concentrations relative to more potent catalysts, in order to meet particular activity and foam property specifications of the foam manufacturer. The use of higher concentrations in turn may enhance any potential deleterious effects of residual amino nitrogen on foam properties. In view of its low cost and low odor, DMEA is typically used in combination with other amines either as a catalytically active diluent for more potent and expensive amines or to "spike" the activity of less potent but more expensive catalysts.

Further in regard to DMEA as well as certain amines of the catalytically potent variety such as triethylenediamine and N,N-dimethylcyclohexylamine, it is found that, whereas they may be suitable for forming conventional flexible and rigid foam, they are unsatisfactory catalysts over a broad range of concentration for the manufacture of void-free, semi-fleixble molded foam.

It is also found that certain amines which have widespread application in the manufacture of flexible polyether slabstock such as bis[2-(N,N-dimethylamino)ethyl]ether, have limited application as catalysts in the manufacture of rigid foam blown with fluorocarbon or a combination of fluorocarbon and water.

It is desirable, therefore, and is a primary object of this invention to advance the art of polyurethane foam manufacture by the employment of relatively low cost, low odor tertiary-amino mono-ols which can be used with advantage from the standpoint of: (1) enhanced catalytic activity relative in particular to N,N-dialkylalkanolamines as typified by N,N-dimethylethanolamine; and/or (2) greater versatility in a wide variety of foam formulations including semi-flexible systems, rigid systems blown with fluorocarbon or a combination of fluorocarbon and water, as well as water-blown flexible polyether foam. Various other objects and advantages of this invention will become apparent to those skilled in the art from the accompanying description and disclosure.

SUMMARY OF THE INVENTION

In accordance with one aspect of the teachings of the present invention, cellular polyurethanes are provided by the method which comprises simultaneously reacting and foaming a reaction mixture containing: (1) an organic polyol reactant comprising a polyether polyol having an average hydroxyl functionality of at least two; (2) an organic polyisocyanate reactant having an average isocyanato functionality of at least two; (3) a blowing agent; and (4) a catalytic system comprising a tertiary-dimethylamino ether mono-ol as more particularly described hereinafter.

The particular amino ether mono-ols employed in the practice of the present invention are characterized by the presence of a tertiary-dimethylamino group, one or more ether oxygen atoms and one hydroxyl group, the said amino and hydroxyl groups being positioned beta to either a common or different acyclic ether oxygen atoms. In those compounds having a plurality of ether linkages, the ether oxygen atoms are also positioned beta to one another. Overall, the amino ether mono-ols employed as described herein have from one to five acyclic ether oxygen atoms and at least six and no more than 26 carbon atoms, no individual continuous carbon chain bonded to ether oxygen having more than four carbon atoms.

The aforesaid essential structural characteristics of the amino ether mono-ols employed in the practice of this invention are conveniently expressed by the following general Formula I:

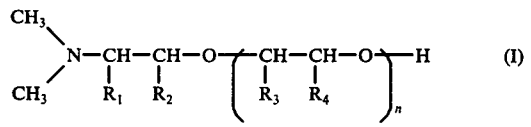

wherein and as defined for the purpose of the entire specification:

$R_1$ and $R_2$ each represents hydrogen, methyl or ethyl provided that, cumulatively, $R_1$ and $R_2$ have no more than two carbon atoms;

$R_3$ and $R_4$ each represents hydrogen, methyl or ethyl provided that, cumulatively, $R_3$ and $R_4$ have no more than two carbon atoms; and $n$ has an average value from one to about five.

In the compounds encompassed by Formula I, the $R_1$, $R_2$, $R_3$ and $R_4$ grouos may be the same as or different from one another.

The above-described dimethylamino ether mono-ols are useful as catalysts in the manufacture of a wide variety of cellular urethanes ranging from waterblown flexible polyether foam to fluorocarbon-blown rigid foam including semi-flexible and high-resilience foam. Accordingly, in the method of this invention the blowing agent can be water, a fluorocarbon or a combination of water and fluorocarbon. Suitable organic polyol reactants for use in the practice of this invention are polyether polyols having an average hydroxyl functionality of from two to about 8 including polymer/polyether polyols produced by the in situ polymerization of an ethylenically unsaturated monomer in a polyether polyol. Illustrative of the polyisocyanates that can be employed are aromatic diisocyanates, polymeric aryl isocyanates, and polyfunctional isocyanates produced as residue products in the manufacture of aromatic diisocyanates. In addition to their catalytic versatility, the said dimethylamino ether mono-ols have the further highly desirable characteristic of low residual odor and thus allow for the formation of foam products essentially free of the post-cure odor associated with many other tertiary-amines.

Particularly versatile catalyst systems for use in the practice of the present invention are those comprising at least one of the following compounds within the scope of Formula I which compounds, for the sake of brevity, are also referred to herein by the abbreviations, DMEE and DMEEE, as indicated DMEE = 2-(2-dimethylaminoethoxy)ethanol which has the formula.

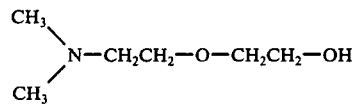

DMEEE = 2-[2-(2-dimethylaminoethoxy)ethoxy]ethanol which has the formula,

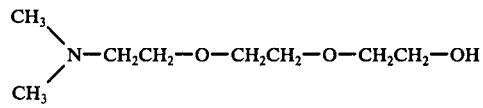

In addition to their versatility and, as discussed and demonstrated with specific reference to foam data presented herein, DMEE and DMEEE are used with particular advantage and exhibit unexpected catalytic activity in the formation of one-shot, water-blown, flexible polyurethane foam derived from a polyether polyol and in the formation of rigid foam blown with a blowing agent comprising water. Other beneficial and unexpected properties include ability to provide water-blown flexible foam of enhanced porosity and void-free semi-flexible foam.

The amino ether mono-ols may be employed in substantially pure form or in combination with distillable residual by-products produced in their manufacture. They are effective activators when used as the sole type of nitrogen-bearing catalytic component of polyurethane foamproducing reaction mixtures, although their employment in combination with other tertiary amines and/or organic compounds of tin is found to be beneficial in a number of foam-producing reaction mixtures.

Thus the present invention also provides for the formation of cellular urethane polymers in the presence of amine catalyst system comprising the ethers encompassed by Formula I in combination with one or more other types of tertiary-amines. Such additional amines include: bis[2-(N,N-dimethylamino)alkyl]ethers such as in particular bis[2-(N,N-dimethylamino)ethyl]ether; residue product formed in the manufacture of the latter bis-ether by the method described and claimed in co-pending application Ser. No. 477,810, filed June 10, 1974, of J. L. Ferrell and F. Poppelsdorf, now U.S. Pat. No. 3,957,875, as discussed in greater detail hereinbelow; 3-dialkylamino-N,N-dimethylpropionamides such as in particular 3-dimethylamino-N,N-dimethylpropionamide; N,N-dimethylcyclohexylamine; 3-dialkylaminopropionitriles; and hydrocarbyl polyamines including triethylenediamine, N,N,N',N'-tetraalkylethylenediamines, 1,1,4,7,7-pentaalkylidiethylenetriamines and N,N,N',N-tetraalkyl-1,3-butanediamines.

Also contemplated is the formation of polyether polyol-derived urethane foam in the presence of the amino ether mono-ols encompassed by Formula I in combination with organic compounds of tin such as, in particular, tin carboxylates and dialkyltin dicarboxylates either as the sole type of co-catalyst or in further combination with an additional tertiary-amine such as the aforementioned mono and polyamines.

Also included within the scope of the present invention are catalyst blends comprising at least one amino ether mono-ol encompassed by Formula I such as in particular the aforementioned DMEE and DMEEE, a second amine component and/or an organic compound of tin such as in particular dibutylin dilaurate.

DETAILED DESCRIPTION OF THE INVENTION AND PREFERRED EMBODIMENTS

(A) The Dimethylamino Ether Mono-ols

Typical examples of suitable amino ether mono-ols for use in the formation of cellular urethane polymers in accordance with the teachings of this invention are the following compounds:

2-(2-dimethylaminoethoxy)ethanol ("DMEE"),

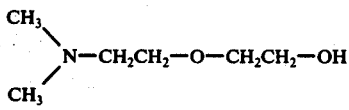 (1)

2-[2-(2-dimethylaminoethoxy)ethoxy]ethanol ("DMEEE")

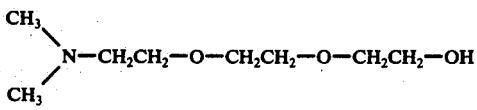 (2)

1-(2-dimethylaminoethoxy)-2-propanol,

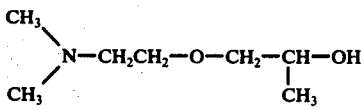 (3)

1-(1-dimethylamino-2-propoxy)-2-propanol,

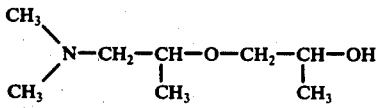 (4)

2-(1-dimethylamino-2-propoxy)ethanol,

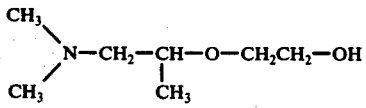 (5)

The catalyst system of the invention may also comprise the following dimethylamino ether mono-ols within the scope of Formula I:

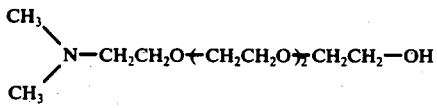 (6)

and

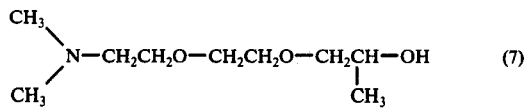 (7)

Of the compounds encompassed by Formula I, the preferred catalysts for use in forming polyurethane foam as described herein are those in which $R_1$ through $R_4$ are hydrogen or methyl. Most preferably, $R_1$ through $R_4$ are hydrogen. From the standpoint of the number of ether linkages, n preferably has an average value no more than about three and is most preferably from one to about two. Accordingly, the particularly outstanding dimethylamino ether mono-ols for use in forming cellular urethane polymers as described herein are the aforementioned 2-(2-dimethylaminoethoxy)ethanol (DMEE) and 2-[2-(2-dimethylaminoethoxy)ethoxy]ethanol (DMEEE) which are known compounds.

The dimethylamino ether mono-ols employed in the practice of the invention may be prepared by a number of different types of known reactions. One such method comprises reacting dimethylamine and an alkylene oxide in accordance with the following equation 1.

Equation 1:

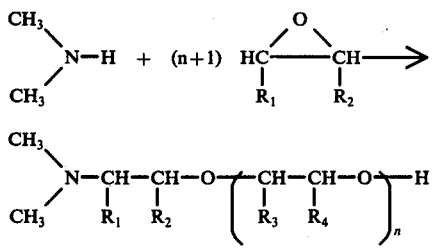

wherein: $R_3$ and $R_4$ are the same as $R_1$ and $R_2$, Consistent with the structure of the compounds encompassed by Formula I, the alkylene oxide may be ethylene oxide, propylene oxide, 1,2,-butylene oxide or 2,3-butylene oxide. It is evident that the employment of more than one alkylene oxide in the reaction of equation 1 provides products in which $R_3$ and $R_4$ are different from $R_1$ and $R_2$. For example, ethylene oxide and propylene oxide may be added to the reaction either individually or sequentially to provide adducts or mixtures of adducts having a combination of oxyethylene and oxypropylene units. In general, the reaction encompassed by equation 1 are autocatalytic and exothermic, and are effected by adding the alkylene oxide to dimethylamine. Suitable operating conditions include a temperature from about 10° C. to about 150° C. and a pressure from about 0 to about 1000 pounds per square inch gauge. In the employment of ethylene oxide, the reaction is carried out under autogenous pressure and usually at temperatures less than about 60° C.

Another method for preparing the dimethylamino ether mono-ols encompassed by Formula I comprises oxyalkylation of the parent alkanolamines, that is, compounds having a general formula corresponding to Formula I except wherein n is zero. This method is illustrated by the following equation 2.

Equation 2:

-continued

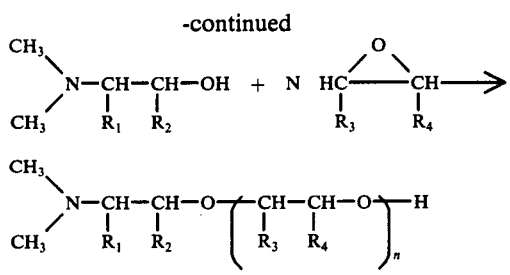

wherein $R_1$, $R_2$, $R_3$ and $R_4$ may be the same as or different from one another.

In general, the oxyalkylation reaction encompassed by equation 2 are effected at a temperature from about 70° C. to about 250° C. Suitable pressures range from substantially atmospheric (0 p.s.i.g.) up to about 2000 p.s.i.g. Oxyalkylation of alkanolamines is usually an autocatalytic reaction although it may be effected in the presence of other basic catalysts such as alkaline metal compounds as illustrated by sodium alkoxides, sodium and potassium hydroxides, and the like. For example, in forming adducts wherein $n$ is greater than two, the addition of an extraneous catalyst may be beneficial in enhancing the rate of reaction. The rate of reaction may also be accelerated by operating at increased temperatures within the aforesaid range. The alkanolamine reactant is preferably employed in relatively large molar excess relative to alkylene oxide such as from about a three to fifteen-fold molar excess over the desired stoichiometric reaction, that is, the desired value of $n$. The oxyalkylation may be effected employing a single alkylene oxide reactant (that is, ethylene oxide, propylene oxide or a vicinal butylene oxide), or a combination thereof added as a mixture or sequentially.

It is to be understood that the reactions encompassed by equation 2 may be effected in controlled sequence, that is, by reaction and recovery of the initially formed one mole adduct ($n = 1$), followed by reaction thereof with additional alkylene oxide and recovery of the two mole adduct ($n = 2$), and so forth. These individual reactions are shown by the following equations 2a and 2b while illustrate the preparation of the preferred amino ether alcohols, DMEE and DMEEE, respectively, for use in the practice of the present invention Equation 2a:

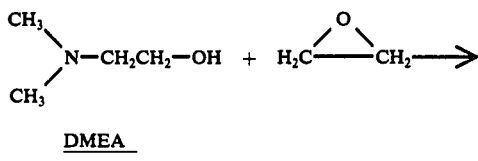

DMEA

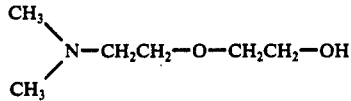

DMEE

Equation 2b:

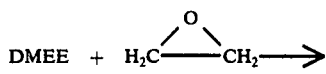

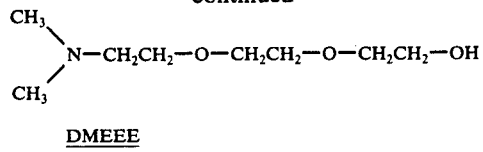

DMEEE

In providing the dimethylamino ether alcohols by the abovedescribed oxyalkylation of hydroxyl groups of alkanolamines, in addition to the intended adduct such as DMEE, higher adducts such as DMEEE as well as other products may also form. It is to be understood, therefore, that the amino ether alcohols may be employed in the formation of cellular urethanes as described herein as single compounds in substantially pure form (about 95 percent and higher), in combination with one another, as well as in combination with by-products formed during their preparation such as by oxyalkylation of an alkanolamine or by oxyalkylation of a lower adduct such as DMEE or DMEEE to form an adduct in which $n$ has a higher value. For example, in the continuous production of DMEE by the oxyethylation of DMEA at a temperature from about 110° C. to about 190° C., a pressure from about 800 to about 2000 p.s.i.g. and a mole ratio of DMEA:ethylene oxide from about 3:1 to about 15:1, it is found that DMEEE is also formed together with other by-products. Product DMEE is recovered from the process in substantially pure form (95+ percent) by distillation under reduced pressure. Typically, DMEE is recovered as distillate having a boiling range of 90°-110° C. at 25 millimeters (mm.) of mercury pressure, or 115°-120° C. at 35-45 mm. Such recovery of the DMEE product by distillation leaves a heavier distillable residue product comprising DMEEE. In general, distillation of said residue product allows for recovery of a fraction boiling within the range from about 90° C. to about 160° C. at about 5 mm. mercury pressure which fraction contains, on the average, from about 50 to about 80 weight percent of DMEEE, and varying amounts of DMEE such as trace amounts (< 2 percent) up to about 15 weight percent, as well as minor amounts of other components. The DMEE content of the distilled residue depends largely on the efficiency of the recovery of DMEE from the original reaction product. The DMEEE content of the distilled residue depends primarily on whether the recovered distillate is taken as the aforementioned full boiling range fraction (90°-160° C./5 mm.), as a narrower cut (e.g., 120°-140° C./10 mm.), or as a further refined fraction. In any event, it is found that this distilled residue, which for convenience is referred to herein as "DMEEE-R", is a catalytically effective material for use in forming urethane foam in accordance with the teachings of the present invention. The nature of the other components which are present in DMEEE-R has not been fully elucidated. It appears, however, that the most likely components are various linear ethoxylated derivatives of dimethyl and monomethyl amines. Analysis by gas chromatography and nuclear magnetic resonance indicates the presence of varying amounts (up to about 40 weight percent) of monomethyl-substituted material which may comprise methyldiethanolamine, an ethylene oxide adduct of methyldiethanolamine or a combination thereof, and minor amounts of other unidentified components.

In addition to the reactions of equations 1 and 2, the amino ether mono-ols employed in the practice of the present invention can be prepared by the reaction of alkali metal salts of N,N-dimethylaminoalkanols with alkylene halohydrins. This method is illustrated by the following equation 3.

Equation 3:

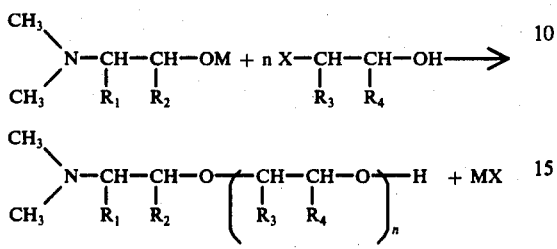

wherein M is alkali metal such as sodium and potassium, X is halogen such as chlorine or bromine, and $R_3$ and $R_4$ may be the same as or different from $R_1$ and $R_2$. The reactions encompassed by equation 3 are suitably effected at temperatures from about 20° C. to about 150° C.

A further method comprises the reaction of an alkylene halohydrin and an alkylene oxide in the presence of a strong acid as sulfuric acid, followed by reaction of the resulting adduct with an excess of dimethylamine as an acceptor of hydrogen halide by-product. This two-stage method is illustrated by equations 4a and 4b.

Equation 4a:

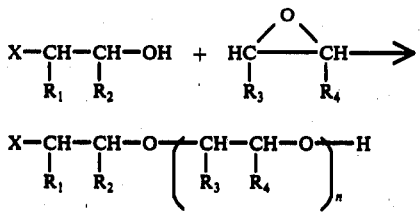

Equation 4b:

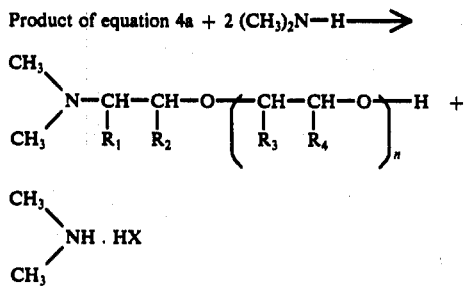

The reactions encompassed by equation 4a are effected at temperatures from 0° C. to about 200° C. (more usually from 20° to 120° C.) and at autogenous pressures up to about 1000 p.s.i.g. Suitable conditions for the reactions encompassed by equation 4b include temperatures from about 50° to about 150° C. and pressures from atmospheric up to about 500 p.s.i.g.

A fifth method for preparing compounds within the scope of Formula I comprises the reaction of an alkali metal salt of either an N,N-dimethylalkanolamine or an alkali metal salt of an oxyalkylated N,N-dimethylalkanolamine containing one less oxyalkylene unit than is desired in the intended product, with an appropriate alpha-halogen substituted carbonyl compound, followed by reduction of the intermediate amino ether carbonyl product. This method is illustrated by the following equations 5a and 5b.

Equation 5a:

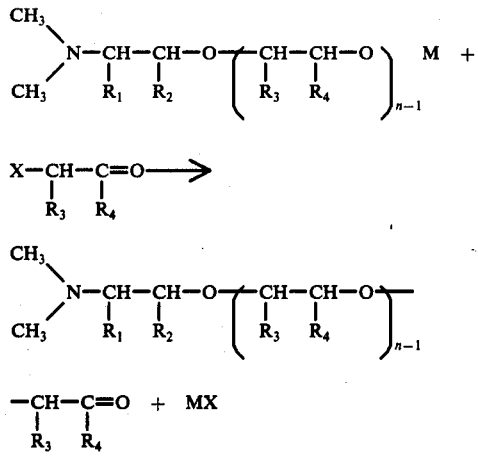

Equation 5b:

Product of equation 5a + $H_2 \longrightarrow$

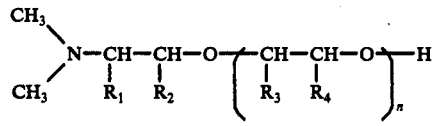

wherein, as previously defined, n has a value from one to about five. The reaction of equation 5a is suitably effected at temperatures from about 30° C. to about 150° C. and pressures from atmospheric to 500 p.s.i.g. The hydrogenation reaction of equation 5b may be carried out at temperatures from about 50° C. to about 200° C. and pressures from 50 to about 1000 p.s.i.g.

B. THE FOAM FORMULATIONS

In producing cellular urethane polymers in accordance with the teachings of this invention, in addition to the catalyst systems comprising the dimethylamino ether mono-ols described herein, the reaction mixture or foam formulation contains an organic polyisocyanate and an organic polyol containing a polyether polyol having an average of at least two and usually not more than eight hydroxyl groups. Such organic polyol reactants include compounds consisting of carbon, hydrogen and oxygen as well as compounds which contain these elements in combination with phosphorus, halogen and/or nitrogen. Suitable classes of organic polyol reactants for use in the method of this invention are polyether polyols including nitrogen-containing polyether polyols and polymer/polyether polyols produced by polymerizing an ethylenically unsaturated monomer in a polyether polyol in the presence of a free radical initiator.

It is well known to the cellular polyurethane art that the particular polyol reactant or combination of polyols employed in any given formulation depends in large measure upon the end-use application of the cellular product, and that the end-use in turn determines whether the product is to be provided as a flexible, semi-flexible, highresilience or rigid foam. A characteristic of the polyol reactant is its hydroxyl number which is determined by and defined as the number of milligrams of potassium hydroxide required for the complete neutralizatiion of the hydrolysis product of the fully acetylated derivative prepared from 1 gram of polyol or mixture of polyols. The hydroxyl number is also defined by the following equation which reflects its relationship with the functionality and molecular weight of the polyol reactant:

$$\text{OH No.} = \frac{56.1 \times 1000 \times f}{M.W.}$$

where:
OH = hydroxyl number of the polyol;
$f$ = average functionality, that is, average number of hydroxyl groups per molecule of polyol; and
M. W. = average molecular weight of the polyol.

The catalyst systems of the present invention are suitably employed as catalytic components of formulations containing polyether polyols having an average hydroxyl number from about 18 to about 1000. In producing flexible polyether urethane foam, the polyether polyol reactant has a relatively low hydroxyl number such as from about 20 to about 125. For flexible foam the hydroxyl number is usually no more than about 75. Generally employed for rigid foam formulations are organic polyol reactants comprising polyether polyols having a relatively high hydroxyl number from about 200 up to about 1000 such as, in particular, a hydroxyl number within the range from about 300 to about 800. In providing semi-flexible foam, the organic polyol reactant may be a polyether polyol having a hydroxyl number within the range from about 100 to about 200. For the manufacture of semi-flexible foam of enhanced load-bearing properties, however, the polyol reactant preferably comprises a polymer/polyol having a hydroxyl number from about 20 to about 65. For high-resilience urethane foam, the organic polyol reactant also preferably comprises a polymer/polyol the hydroxyl number of which may be from about 18 to about 65.

Suitable polyether polyols of which the organic polyol reactant may be comprised include linear and branched polyethers having an average functionality from two to eight. For convenience, this class of polyether polyols are referred to herein as Polyol I. These polyols include alkylene oxide adducts of water such as polyethylene glycols having average molecular weights from about 200 to about 600, polypropylene glycols having average molecular weights from about 400 to about 2000, and polyoxyalkylene polyols having a combination of different alkylene oxide units. Other suitable polyols encompassed within the definition of Polyol I are the alkylene oxide adducts of polyhydric organic initiators, the nature of which determines the average hydroxyl functionality of the polyoxyalkylated product. Illustrative of suitable polyhydric organic initiators are the following which can be employed individuallly or in combination with one another: (1) diols such as ethylene glycol, diethylene glycol, propylene glycol, 1,5-pentanediol, hexylene glycol, dipropylene glycol, trimethylene glycol, 1,2-cyclohexanediol, 3-cyclohexene-1,1-dimethanol and 3,4-dibromocyclohexane-1,1-dimethanol; (2) triols such as glycerol, 1,2,6-hexanetriol, 1,1,1-trimethylolethane, 1,1,1-trimethylolpropane, 3-(2-hydroxyethoxy)- and 3-(2-hydroxypropoxy)-1,2-propanediols, 2,4-dimethyl-2-(2-hydroxyethoxy)methyl-pentanediol-1,5,1,1,1,-tris [ (2-hydroxyethoxy)methyl]ethane and 1,1,1-tris[ (2-hydroxypropoxylmethyl]propane; (3) tetrols such as pentaerythritol; (4) pentols, hexols, heptanols and octanols such as glucose, sorbitol, bis(2,2,2-trimethylol)ethyl ether, alpha-methyl glucoside, sucrose, mannose and galactose; (5) compounds in which hydroxyl groups are bonded to an aromatic nucleus such as resorcinol, pyrogallol, phloroglucinol, di-, tri- and tetra-phenylol compounds such as bis(p-hydroxyphenyl)methane and 2,2-bis(p-hydroxyphenyl)propane; and (6) alkylene oxide adducts of the aforesaid initiators such as propylene or ethylene oxide adducts of glycerol having a relatively low average molecular weight up to about 650.

Particularly useful in the preparation of flexible polyether urethane foam are the polyether polyols having an average hydroxyl functionality of from 2 to about 4 and, as aforementioned, a hydroxyl number from about 20 to about 125. For rigid foam formulations, the polyol reactant comprises a polyether polyol (including nitrogen-containing polyether polyols discussed herinbelow) having an average hydroxyl functionality from about 3 to about 8, and a hydroxyl number from about 200 up to about 1000. It is to be understood that the organic polyol component of rigid foam formulations may additionally contain, as a second type of polyol reactant, a diol having a hydroxyl number from about 200 to about 800.

The above-described polyether polyols are normally liquid materials and, in general, are prepared in accordance with well known techniques comprising the reaction of one or more polyhydric starters and an alkylene oxide in the presence of an oxyalkylation catalyst. Usually, the catalyst is an alkali metal hydroxide such as, in particular, potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations, as defined above. The alkylene oxides most commonly employed in providing the reactants encompassed by Polyol I, are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of organic polyol reactants that are suitable for use in preparing polyurethane foams in accordance with the present invention are polymer/polyols which, for convenience, are referred to herein as Polyol II. Such polyols have hydroxyl numbers from about 18 to about 65. They are produced by polymerizing one or more ethylenically unsaturated monomers dissolved or dispersed in any of the other types of organic polyol reactants described herein, in the presence of a free radical catalyst. Illustrative of suitable substrate polyols for producing such compositions are those polyether polyols encompassed by the definition of Polyol I which have an average hydroxyl functionality from 2 to about 5. Also effective as the substrate polyol are the polyether polyols defined hereinbelow as Polyol III. Illustrative of the ethylenically unsaturated monomers are vinyl compounds having the general formula,

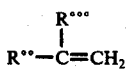

wherein: R°° is hydrogen, methyl or any of the halogens (i.e., fluorine, chlorine, bromine or iodine); and R°°° is R°°, cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, methyl methacrylate, and butadiene. In general, such compositions are prepared by polymerizing the monomers in the substrate polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis-(isobutyronitrile).

The polymer/polyol compositions usually contain from about 5 to about 50, and more usually from about 10 to about 40, weight percent of the vinyl monomer or monomers polymerized in the substrate polyether polyol. Especially effective polymer/polyols are those having the following composition:

A. from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of monomeric units of (1) and (2), respectively; and B. from about 90 to about 70 weight percent of one or more of the aforementioned types of substrate polyether polyols.

A third class of polyether polyols of which the organic polyol reactant may be comprised are polyether polyols having the following combination of characteristics: (1) an average hydroxyl functionality from 2.1 to about 5; (2) a hydroxyl number from about 40 to 18; and (3) an average primary hydroxyl content between about 35 and about 85 mole percent, based on the total number of hydroxyl groups contained in the polyol. For convenience, this particular class of polyols are referred to herein as Polyol III. This class of polyols are derived from ethylene oxide and propylene oxide and one of the aforesaid organic initiators having a hydroxyl functionality from about 3 to about 5 (such as, for example, glycerol) including appropriate mixtures of such initiators with one another and/or in combination with dihydric starters. The high primary hydroxyl content is introduced by capping of the polyoxyalkylene chains with at least a portion of the total ethylene oxide feed. Such highly reactive polyethers (i.e., Polyol III) are also especially useful as the substrate polyol in which the above-described polymer/polyols are formed.

As previously noted, for semi-flexible foam of enhanced load-bearing properties, polymer/polyols (Polyol II) are preferably employed. In general, the organic polyol reactant of such semi-flexible foam formulations is constituted of from about 50 up to 100 percent by weight of such polymer/polyols and correspondingly from about 50 to 0 weight percent of another polyether polyol which may be one or more of the polyether polyols encompassed by the above-described respective classes designated Polyol I and Polyol III. Usually, at least about 80 weight percent of the total polyol contained in such semi-flexible formulations is constituted of the polymer/polyols. When used, the second polyether polyol component is preferably of the type within the scope of Polyol III.

For formation of high-resilience foam, the organic polyol reactant comprises a polyether polyol within the class defined above as Polyol III. They may be used as essentially the sole type of polyether polyol in the formulation or they may be employed in combination with other polyols to control the degree of softness or firmness of the foam and to vary the load-bearing properties. For example, when softer grade high-resilience foams are desired, Polyol III may be used in combination with polyether diols such as the above-described lower alkylene oxide adducts of a dihydric initiator such as dipropylene glycol. However, when firm grades of high-resilience foams having enhanced load-bearing properties are desired, the organic polyol reactant of the foam formulation preferably comprises a polymer/polyol. In such high-resilience formulations, the organic polyol reactant is constituted of from about 20 up to about 60 weight percent of polymer/polyol and correspondingly from about 80 to about 40 weight percent of those polyether polyols encompassed by the definition of Polyol III. Usually, the high-resilience formulation contains no more than about 50 weight percent of polymer/polyol based on the weight of total polyol reactant contained in the formulation.

Another class of suitable polyether polyols for use in the practice of this invention are nitrogen-containing polyols. Illustrative of this class are lower alkylene oxide adducts of the following polyfunctional amines which may be employed individually or in combination: primary and secondary polyamines such as ethylenediamine, diethylenetriamine and toluenediamine; and aminoalkanols such as ethanolamine, diethanolamine, triethanolamine and triisopropanolamine. Also suitable are mixed starters containing one or more of the aforesaid polyfunctional amines, aniline, and/or one or more of the polyhydric initiators employed to produce Polyol I such as dipropylene glycol, glycerol, sucrose and sorbitol. Preferably, the alkylene oxide is ethylene oxide, propylene oxide or a combination thereof. Such nitrogen-containing polyether polyols are usually employed in rigid foam formulations either as the sole type of organic polyol reactant or in combination with one or more polyether polyols encompassed by Polyol I. For application in forming rigid foam, such nitrogen-containing polyols, that is, polyols derived at least in part from a polyfunctional amine starter, also have hydroxyl numbers which are within the range from about 200 to about 1000, and are more usually from about 300 to about 800. Other types of nitrogen-containing polyols are aniline/formaldehyde and aniline/phenol/formaldehyde condensation products which are also useful in rigid foam formulations.

The polyisocyanates used in the manufacture of cellular polyurethanes are known to the art and any such reactants are suitably employed in the practice of the present invention. Among such suitable polyisocyanates are those represented by the general formula:

$$Q(NCO)_i$$

wherein: $i$ has an average value of at least two and is usually no more than six, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing the polyurethanes of this invention are any of the following including mixtures thereof: 1,6-hexamethylenediisocyanate; 1,4-tetramethylenediisocyanate; bis(2-isocyanatoethyl)-fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate; isophoronediisocyanate; methylene-4,4'-dicyclohexyl-diisocyanate; durylene diisocyanate; triphenylmethane-4,4',4''-triisocyanate; and other organic polyisocyanates known to the polyurethane art. Of the aforesaid types of polyisocyanates, those containing aromatic nuclei are generally preferred.

Also useful as the polyisocyanate reactant are polymeric isocyanates having units of the formula:

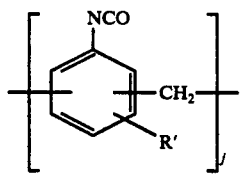

wherein R' is hydrogen and/or lower alkyl and $j$ has an average value of at least 2.1. Usually, the lower alkyl radical is methyl and $j$ has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50-500 centipoises at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation. Suitable polymeric isocyanates of this type for use in the practice of this invention are those available commercially as PAPI 901 (The Upjohn Company) and NIAX Isocyanate AFPI (Union Carbide Corporation).

Also useful as polyisocyanate reactants are tolylene diisocyanate residues obtained from the manufacture of the 2,4- and 2,6- isomers of tolylene diisocyanates, and having a free -NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, even often solid, materials. It is the evaporator tail material which is commonly referred to as tolylene diisocyanate residue.

Other useful polyisocyanate reactants are "liquid MDI," and combinations of diisocyanates with polymeric isocyanates having an average of more than two isocyanate groups per molecule. Illustrative of such combinations are: a mixture of 2,4-tolylene diisocyanate, 2,6-tolylene diisocyanate and the aforesaid polyphenylmethylene polyisocyanates and/or the aforementioned tolylene diisocyanate residue product.

The aforesaid types of polyisocyanate reactants are generally useful in forming cellular urethane polymers of the flexible, semi-flexible, high-resilience and rigid variety. For example, in regard to semi-flexible foam formulations, tolylene diisocyanates, tolylene diisocyanate residue and polymeric isocyanates are suitable. More usually, however, semi-flexible formulations contain the polymeric isocyanates such as PAPI, AFPI and the like. The more commonly employed polyisocyanates for rigid foam formulations are tolylene diisocyanate residue and polymeric isocyanates. For rigids, tolylene diisocyanates are also useful although they are usually employed for this purpose as quasi-prepolymers having a free —NCO content from about 25 to about 35 percent. In regard to high-resilience formulations, polyisocyanates used with particular advantage are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high-resilience formulations contain the isomeric diisocyanates as essentially the sole source of reactive -NCO, it is often desirable to include minor amounts of cross-linking agents, such as up to about 1.5 parts by weight per one hundred parts of polyol reactant.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from 0.8 to 1.5, usually from 0.9 to 1.35, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range from about 90 to about 135. More usually, in flexible, semi-flexible and high resilience formulations the Isocyanate Index is no more than about 115.

The catalyst systems of the present invention are comprised of the dimethylamino ether mono-ols either individually, in combination with one another or as distillable residue products formed in their manufacture such as the above-described "DMEEE-R". The catalyst systems of the invention may additionally contain another tertiary-amine component and/or an organic compound of tin. Thus, the catalyst systems employed in the practice of the invention may contain the dimethylamino ether mono-ol as essentially the sole type of catalytic component. The catalyst systems may also be binary systems in the sense of containing the dimethylamino ether mono-ol in combination with either at least one other tertiary-amine component or at least one organic compound of tin. Further, the catalyst systems may also be ternary in the sense of containing at least one other tertiary-amine component and, additionally, at least one organic compound of tin. In their use as components of cellular urethane formulations as described herein, the catalyst systems are present in the foam formulation in a catalytically effective amount. Thus, the total concentration thereof may vary over a relatively wide range such as from about 0.01 to about 12 or more parts by weight (exclusive of any carrier solvent or other non catalytic additive) per one hundred parts by weight of the total polyol reactant (p.p.h.p.) contained in the reaction mixture. The more usual concentration is from about 0.05 to about 10 p.p.h.p. The particular concentration employed in any given formulation depends upon the nature of the intended foam product. For example, in flexible polyether and high-resilience foam formulations, the catalyst systems of the invention are usually employed in an amount from about 0.05 to about 4 p.p.h.p. In rigid and semi-flexible formulations, the catalyst systems may be used in amounts from about 0.1 up to about 12 p.p.h.p., although usually no more than about 10 p.p.h.p. is used.

Among the suitable classes of other tertiary-amines of which the catalyst systems of the invention may be comprised are tertiary-amines consisting of carbon, hydrogen and amino nitrogen. Such hydrocarbyl amines may contain one or more tertiary-amino groups such as up to about five, and from three to 24 and usually no more than 12 carbon atoms. Illustrative of suitable hydrocarbyl mono- and polyamines which may be employed as catalyst components of the dimethylamino ether mono-ol-containing catalyst systems of the invention are one or more of the following: trimethylamine; triethylamine; tributylamine; N,N-dimethylcyclohexylamine; N,N-dimethylbenzylamine; triethylenediamine; N,N,N',N'-tetramethylethylenediamine; N,N,N',N'-tetraethylethylenediamine; N,N,N',N'-tetramethyl-1,3-butanediamine; and 1,1,4,7,7-pentamethyldiethylene-triamine.

Another class of suitable tertiary-amines which may be present in the catalyst systems of the present invention are the beta-amino carbonyl compounds described in U.S. Pat. No. 3,821,131 such as, in particular, the 3-dialkylamino-N,N-dimethylpropionamides. Of this class, 3-dimethylamino-N,N-dimethylpropionamide is a particularly useful component of the catalyst systems described herein.

A third class of tertiary-amines for use as a catalytic component of the catalyst systems of this invention are bis[2-(N,N-dimethylamino)alkyl]ethers such as, in particular, bis[2-(N,N-dimethylamino)ethyl]ether ("BDMEE").

Also useful as an amine catalyst for use in combination with the dimethylamino ether alcohols as described herein is distilled residue product formed in the manufacture of the aforementioned bis[2-(N,N-dimethylamino)ethyl]ether ("BDMEE") by the method of copending application Ser. No. 477,810, filed June 10, 1974, in the names of J. F. Ferrell and F. Poppelsdorf, now U.S. Pat. No. 3,957,875. The said method comprises reacting trimethylamine and 2-(2-dimethylaminoethoxy)ethanol ("DMEE") in the presence of a nickel catalyst such as Raney nickel, at a temperature with the range from about 50° C. to about 300° C. employing at least one mole up to about 10 moles of trimethylamine per mole of DMEE. A generally preferred combination of reaction conditions for continuous production of BDMEE includes operating at a temperature from about 140° to about 200° C. under autogenous pressures from about 500 to about 2000 p.s.i.g. employing a mole ratio from about 2 to about 5 moles of trimethylamine per mole of DMEE. The reaction mixture is filtered to remove catalyst and is then fractionally distilled, first under pressure to remove unreacted trimethylamine (e.g., overhead boiling up to 80° C. at 30 to 40 p.s.i.g.), then at atmospheric pressure up to 105° C. to remove a water/N-methylmorpholine azeotrope, then at reduced pressure to recover overhead containing BDMEE as the major component (boiling range of 100°-120° C. at 50 millimeters of mercury pressure) and a further overhead fraction containing unreacted DMEE (boiling range from about 120° to about 130° C. at 55 mm. mercury pressure). The product remaining in the still after separation of the latter fraction is then combined with residual product remaining after further distillation (105° C. at 50 mm.) of the aforementioned BDMEE-containing cut. The combined material is then subjected to distillation to separate overhead boiling from about 65° C. to about 85° C. at 1-2 mm. mercury pressure, and finally a heavier fraction is recovered having a boiling range from about 85° C. to about 180° C. at 1-2 mm. of mercury pressure. The latter distillate constitutes from about 50 to about 70 percent by weight of the combined residues from which it is recovered. For convenience, this particular distilled residue including narrower cuts thereof, derived from the aforementioned method for producing bis[2-(N,N-dimethylamino)ethyl]ether is referred to herein as "BDMEE-R." This material is catalytically active for cellular urethane formation and is particularly suited for use in combination with the dimethylamino ether alcohols described herein. The said distilled residue product, BDMEE-R, is a complex mixture of components which have not been identified. Without wishing to be bound by any theory, it is believed that the major components (60 to 75 percent by weight) are polymers of BDMEE such as those having the formula,

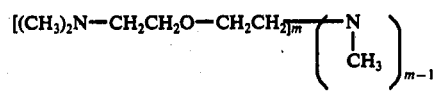

where $m$ has a value of two upwards of about five. For example, when $m$ is two, the polymer would be a triamine,

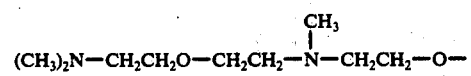

—CH$_2$CH$_2$N(CH$_3$)$_2$ and when $m$ is three, the polymer would be a tetramine, and so forth. Other possible components of BDMEE-R are,

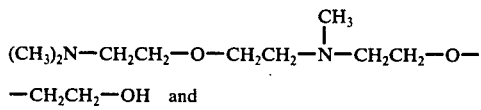

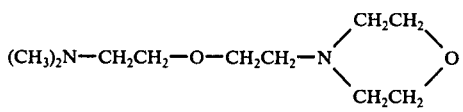

Other classes of tetiary-amines which may be used in combination with the dimethylamino ether mono-ols as described herein are: N,N-dialkylalkanolamines such as, in particular, N,N-dimethylethanolamine; the beta-aminopropionitriles described in the aforementioned copending application Ser. No. 369,556, filed June 13, 1973, now U.S. Pat. No. 3,925,268 such as, in particular, 3-dimethylaminopropionitrile; and saturated heterocyclic tertiary-amines such as N-methylmorpholine; N-ethylmorpholine, 1,4-dimethylpiperazine and N-(2-hydroxyethyl)piperazine.

Suitable organic tin compounds which may be contained in the catalyst systems of the invention are any of the following: stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such stannous and stannic salts as well as dialkyltin oxides, trialkyltin oxides, tin mercaptides such as, for example, di-n-octyl tin mercaptide, and the like.

When the dimethylamino ether mono-ol is used in combination with other catalysts, the components of the catalyst system may be added to the foam formulation as individual streams or in preblended form.

In accordance with a more specific embodiment of the present invention, the catalyst systems of the above-described binary or ternary type are provided and introduced to the foam formulation in preblended form. In general, such blends contain: (1) a total of from about 5 to about 98 weight percent of the dimethylanino ether mono-ol component including DMEEE-R which is described above with specific reference to equation 2a, (2) a total of from about 2 to about 95 weight percent of one or more of the above-described other types of tertiary-amine components including BDMEE-R, and (3) zero or up to about 15 weight percent of an organic compound of tin, the said weight percentages being expressed on the basis of the combined total weight of components (1), (2) and (3) contained in the blend (that is, exclusive of any carrier solvent or other non catalytic additive). When present, the total concentration of tin compound in the blend is at least about 0.1 and is usually at least about 0.5 and no more than about 10 weight percent.

The blended catalyst systems of the invention usually contain: (1) a total of from about 10 to about 95 weight percent of the dimethylamino ether mono-ol component; (2) a total of from about 5 to about 90 weight percent of one or more of the above-described other types of tertiary-amine components; and (3) from zero up to about 10 weight percent of the organic compound of tin. When component (2) comprises dimethylethanolamine, the latter is generally present in the blend in an amount of no more than about 60, and usually no more than about 50, weight percent.

Illustrative of generally preferred blended catalyst systems of the invention are those containing:

1. a total of from about 10 to about 90 weight percent of the dimethylamino ether mono-ol component such as, in particular, 2-(2-dimethylaminoethoxy)ethanol (DMEE), 2-[2-(2-dimethylaminoethoxy)ethoxy]ethanol (DMEEE) or the above-described distillate by-product (DMEEE-R) formed in the manufacture of DMEE, including any combination of such dimethylamino ether mono-ol components;

2. a total of from about 10 to about 90 weight percent of bis[2-(N,N-dimethylamino)ethyl]ether (BDMEE), the above-described distillate by-product (BDMEE-R) formed during the manufacture of BDMEE, 3-dimethylamino-N,N-dimethylpropionamide, N,N-dimethylcyclohexylamine, or a hydrocarbyl polyamine (such as, in particular, triethylenediamine, N,N,N',N'-tetramethylethylenediamine, N,N,N',N'-tetramethyl-1,3-butanediamine, and 1,1,4,7,7-pentamethyl-diethylenetriamine) including any combination thereof;

3. zero or up to about 60 weight percent of dimethylethanolamine; and 4. zero or up to about 10 weight percent of an organic compound of tin such as, in particular, dibutyltin dilaurate or stannous octoate.

When used as a component of such blends, dimethylethanolamine is usually in an amount of at least about 2 and no more than about 50 weight percent.

Especially suitable catalyst systems of the invention for flexible polyether and high-resilience formulations are blends containing:

1. a total of from about 10 to about 80 weight percent of DMEE, DMEEE or DMEEE-R including any combination thereof;

2. a total of from about 20 to about 90 weight percent of bis[2-(N,N-dimethylamino)ethyl]ether, BDMEE-R, 3-dimethylamino-N,N-dimethylpropionamide or a hydrocarbyl polyamine (as above-illustrated) including any combination thereof;

3. from zero up to about 50 weight percent of dimethylethanolamine; and 4. from zero up to about 10 weight percent of an organic compound of tin. Illustrative of this group of blended catalysts of the invention are those containing: (1) a total of from about 10 to about 60 weight percent of at least one of DMEE, DMEEE or DMEEE-R; (2) a total of from about 40 to about 90 weight percent of bis[2-(N,N-dimethylamino)ethyl]ether or BDMEE-R including any combination thereof; (3) zero or up to about 45 weight percent of dimethylethanolamine; and (4) zero or up to about 10 weight percent of stannous octoate or dibutyltin dilaurate.

Especially suitable catalyst systems of the invention for rigid foam formulations are blends containing:

1. a total of from about 40 to about 90 weight percent of DMEE, DMEEE or DMEEE-R including any combination thereof;

2. a total of from about 10 to about 60 weight percent of another tertiary-amine component such as, in particular, bis[2-(N,N-dimethylamino)ethyl]ether, BDMEE-R, 3-dimethylamino-N,N-dimethylpropionamide, N,N-dimethylcyclohexylamine or a hydrocarbyl polyamine (as above-illustrated) including any combination thereof;

3. from zero up to about 40 weight percent of dimethylethanolamine; and 4. from zero up to about 10 weight percent of an organic compound of tin such as, in particular, dibutyltin dilaurate.

For rigid foam formulations, particular advantage is realized in the employment of blends in which the organic compound of tin, especially dibutyltin dilaurate, is present. In such ternary catalyst systems of the invention, the tin compound may be present in an amount from about 0.1 to about 15 weight percent, the more usual concentration being from about 0.5 to about 10 weight percent. In addition to exhibiting good performance latitude in rigid foam formulations, such ternary blends are also effective catalyst systems for other types of formulations such as, for example, those designed for flexible polyether foam formation.

It is to be understood that the dimethylamino ether mono-ols, as well as the above-discussed blends based thereon, may be introduced to the foam formulations in undiluted form or as solutions in suitable carrier solvents or diluents. Commonly employed for this purpose are diethylene glycol, dipropylene glycol and hexylene glycol. Another type of suitable carrier medium for the catalyst systems described herein are organic surfactants which, when used, are usually of the non ionic variety. Such non ionics include: the polyoxyethylene ethers of higher alcohols having from 10 to 18 carbon atoms including mixtures thereof; and polyoxyethylene ethers of alkyl-substituted phenols. Typical of such non ionic organic surfactants for use as the carrier medium for the catalyst systems described herein are the ethylene oxide adducts of nonylphenol having the average composition, $C_9H_{19}$—$C_6H_4$—$(OC_2H_4)_h$—OH, wherein $h$ has an average value from about 4 to about 20, inclusive of whole and fractional numbers, such as 6, 9, 10.5 and 15.

When used, the glycol and/or non ionic organic surfactant type of carrier may be present in the catalyst systems including the above-described blends, in a total amount from about 5 to about 90, and usually in a total amount no more than about 80, weight percent, based on the combined weight of the catalytic components, glycol and/or organic surfactant diluent. The extent of dilution depends primarily on the activity specifications of any given foam formulation.

The foam formulations employed in the practice of the present invention may also contain a minor amount of any of the organic compounds of tin described hereinabove with specific reference to their presence in blended catalyst systems of the invention. Of such organic compounds of tin, stannous octoate and dibutyltin dilaurate are especially effective. It is to be understood that, when used, the tin co-catalyst may be added to the formulation directly as a separate stream, as a component of the above-described catalyst systems of the invention, or by a combination of these two modes of addition. When used, such tin co-catalysts may be present in the formulation in a total amount from about 0.001 to about 3 parts by weight per 100 parts by weight of total polyol reactant. In flexible polyether foam formulations and, when used in semi-flexible foam systems, the organic compound of tin is usually present in a total amount from about 0.01 to about one p.p.h.p., and most preferably in an amount no more than about 0.6 p.p.h.p. For high-resilience formulations, the tin compound is generally used in an amount from about 0.001 up to about 2 p.p.h.p. When used in rigid foam formulations, the tin compound is generally present in the formulation in an amount of at least about 0.01. Although in some rigid systems up to about 3 p.p.h.p. may be used, as a general rule no more than about 2 p.p.h.p. of tin compound is present.

Foaming is accomplished by the presence in the foam formulation of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F., −60°., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; 1,1-dichloro-1-fluorothene; 1,2,2-trifluoro-1,1,2-trichloroethane; 1,1,1-trifluoro-2-fluoro-3,3-difluoro-4,4,4-trifluorobutane; hexafluorocyclobutene; and octafluorocyclobutane.

In general, the blowing agent is employed in an amount of from about 1 to about 100 parts by weight per 100 parts by weight of total polyol reactant, the particular blowing agent and amount thereof depending upon the type of foam product desired. When water is used as the sole or as a partial source of blowing action, generally no more than about 10 p.p.h.p. of water is introduced to the foam system. Flexible polyether foam and high-resilience foam are blown with water either as the sole source of blowing action or in combination with up to about 40 p.p.h.p. of fluorocarbon such as trichlorofluoromethane. Flexible foam formulations usually contain from about one to about 6 p.p.h.p. of water. The more usual water concentration for high-resilience foam systems is from about one to about 4 p.p.h.p. In semi-flexible foam systems, the more commonly employed blowing agent is water (usually from about one to about three p.p.h.p.), although up to about 10 p.p.h.p. of fluorocarbon may also be used. For rigid foam formulations, blowing action is supplied employing a fluorocarbon in a relatively high proportion such as from about 10 to about 100 (usually no more than 80) p.p.h.p., either as the sole type of agent or in combination with up to about 10 p.p.h.p. of water. When present in rigid foam systems, water is usually used in an amount no more than about 5 p.p.h.p. The selection and amount of blowing agent in any particular foam formulation is well within the skill of the cellular polyurethane art.

In producing cellular polyurethanes in accordance with the method of this invention, a minor amount of an organosilicone surfactant may also be present as an additional component of the polyurethane-forming reaction mixture. When used, such surfactants are present in the formulation in a foam-stabilizing amount, that is, in an amount sufficient to prevent collapse of the foam until the foamed product has developed sufficient strength to be self-supporting. Usually, foam-stabilizing amounts do not exceed about 5 parts by weight per 100 parts by weight of total polyol reactant. One class of especially useful stabilizers for flexible polyether-based polyurethane foam are the polysiloxane-poly(oxyethylene-oxypropylene) copolymers described in United States Reissue Pat. No. 27,541. Also suitable are the branched copolymers described in U.S. Pat. No. 2,834,748. Particularly useful as foam-stabilizing components of flexible polyether urethane formulations containing a flame-retardant, are the cyanoalkyl-substituted polysiloxane-poly(oxyalkylene) copolymers described in U.S. Pat. No. 3,846,462. Illustrative of effective foam stabilizing components for high-resilience and semi-flexible foam systems are the relatively low molecular weight particular class of organosilicones described in U.S. Pat. No. 3,741,917. When used in high-resilience and semi-flexible foam systems, the organosilicone component is usually present in an amount between about 0.025 and about 3 p.p.h.p. Illustrative of suitable surfactant components of rigid foam formulations are copolymers wherein the polyoxyalkylene blocks are hydroxy-terminated such as those described in U.S. Pat. No. 3,600,418.

The catalyst systems described herein are also effective catalytic components of foam formulations containing a flame-retardant. The flame-retardants can be chemically combined in one or more of the other materials used (e.g., in the polyol or polyisocyanate), or they can be used as discrete chemical compounds added as such to the foam formulation. The flame-retardant may also be reactive with polyisocyanate and constitute a portion of the total polyol reactant contained in the formulation. In the use of flame-retardants of the chemically reactive variety, due regard should be given to the possible effect of the functionality of the compound on other properties (e.g., degree of flexibility) of the resulting foam. The organic flame-retardants preferably contain phosphorus or halogen, or both phosphorus and halogen, Usually, the halogen, when present, is chlorine and/or bromine. Illustrative of suitable flame-retardants of the discrete chemical compound variety are those disclosed in U.S. Pat. No. 3,846,462 (column 34, beginning with line 39, through column 35, line 12) the disclosure of which in this respect is incorporated as part of the present disclosure by reference thereto. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid types may be employed individually or in combination with one another.

When used, the flame-retarding agent can be present in the foam formulations described herein in an amount from about 1 to about 45 parts by weight per 100 parts by weight of the polyol reactant, the particular amount employed depending largely on the efficiency of any given agent in reducing the burning extent of the foam product.

If desired, other additional ingredients can be employed in minor amounts in producing the polyurethane foams in accordance with the process of this invention. Illustrative of such additives that can be employed are: cross-linking agents such as glycerol, diethanolamine, triethanolamine and their oxyalkylene adducts; additives to enhance load-bearing properties; fillers (e.g., calcium carbonate and barium sulfate which are often used in semi-flexible foam formulations); as well as dyes, pigments anti-yellowing agents and the like.

In general, final or post-curing of the foam products produced in accordance with the method of this invention is achieved by allowing the foam to stand at ambient temperatures until a tack-free product is obtained, or by subjecting the foam to elevated temperatures up to about 500° F. in order to achieve more rapid curing. In those systems based on the more highly reactive polyol reactants such as those employed in producing high-resilience foams, a sufficiently high degree of curing is achieved during foam formation without the necessity of subjecting the foam to conventional high temperature (e.g. 300°-500° F.) post-curing procedures which are otherwise applied in the commercial manufacture of flexible foams from less highly reactive flexible foam formulations.

The polyurethane foams produced in accordance with the present invention are useful as cushioning material, mattresses, automotive interior padding, carpet underlay, packaging, gaskets, sealers, thermal insulators and other such well-known end-use applications.

The following examples are offered as further illustrative of the present invention and are not to be construed as unduly limiting on the scope thereof.

The 2-(2-dimethylaminoethoxy)ethanol ("DMEE") employed in the examples is plant-produced material (purity, 95+ percent) and has a typical boiling range of about 90° to 110° C. at 25 millimeters of mercury pressure.

The 2-[2-(2-dimethylaminoethoxy)ethoxy]ethanol (DMEEE) employed in the examples was prepared as follows: A flask equipped with a magnetic stirrer and a cold-finger type condenser was charged with 2-(2-dimethylaminoethoxy)ethanol (665 grams, 5.0 moles). The contents were heated to 125° C. and addition of ethylene oxide (44 grams, 1.0 mole) was begun. Ethylene oxide was added in small portions via a chilled syringe and required about one hour to complete. After addition, the mixture was subjected to a cookout period of 2 hours at 150°-170° C. Following this, the mixture was fractionated at reduced pressure. An amount of lower boiling materials were removed followed by unreacted 2-(2-dimethylaminoethoxy)ethanol (DMEE), recovered at 95° C./15 mm. Hg, and product 2-[2-(2-dimethylaminoethoxy)ethoxy]-ethanol (DMEEE). The latter was recovered at 128°-135° C./10-15 mm. Hg. [Literature: boiling point = 130°-134° C./12 mm, Hg. Chemical Abstracts, 63, 6899d (1965); C. van der Stelt et al., *Arzneimittel-Forsch.*, 14, 1053 (1964)]. Yield was 66 grams or 37 percent of theory based on ethylene oxide added. The material was redistilled and the heart cut collected and employed. Analysis by nuclear magnetic resonance spectroscopy indicated a purity of greater than 90 percent; a gas-liquid chromatographic analysis indicated a purity of greater than 95 percent.

Various terms, foam procedures and abbreviations repeatedly used or referred to in the examples are explained below:

The abbreviation "p.p.h.p." means parts by weight of a given component per 100 parts by weight of total polyol reactant contained in the foam formulation.

Breathability or Porosity is roughly proportional to the number of open cells in a foam, and was measured in accordance with the NOPCO breathability test procedure described by R. E. Jones and G. Fesman, "Journal of Cellular Plastics" (January 1965). It is a measure of air flow through a 2 × 2 × 1 inch foam sample and is expressed as standard cubic feet per minute (SCFM).

Foaming Procedure I-A (Free-Rise Flexible Polyether Foam)

In accordance with this procedure, the polyether polyol reactant, silicone surfactant, amine catalyst and water are dispensed in predetermined relative proportions into a one-quart capacity container. A stainless steel baffle is inserted into the resulting polyol-containing mixture which is then mixed by means of a turbine blade operated at 2000 revolutions per minute. Mixing is interrupted after 15 seconds and stannous octoate cocatalyst is added from a syringe. Mixing is then continued for an additional 15 seconds, adding the polyisocyanate reactant after the first 8 seconds of this second mixing period. After the mixing cycle, the mixture is poured into a supported container (12 × 12 × inches). The foam is allowed to rise and both the "cream time" and "rise time" are recorded. The latter terms denote the interval of time from the formation of the complete foam formulation to: (1) the appearance of a creamy color in the formulation, and (2) the attainment of the apparent maximum height of the foam, respectively. The foams are oven cured at 120°–150° C. for 12–15 minutes after the rise is complete. A post-curing period of at least one day is allowed at room temperature before foam porosity is measured.

Foaming Procedure I-B (Free-Rise Flexible Polyether Foam)

In accordance with this procedure, the polyether polyol reactant, silicone surfactant, amine catalyst and water are dispensed in predetermined relative proportions into a ½ gallon capacity container. A stainless steel baffle is inserted and a timer is set for a total of 90 seconds. The polyol-containing material is mixed for 60 seconds by means of a turbine blade operated at 2700 revolutions per minute. The mixer is stopped manually for a 15-second degassing period during which stannous octoate co-catalyst is added. The mixer is restarted and continued for the remaining 15 seconds, adding the polyisocyanate after 9 seconds of this final mixing period. The mixture is then poured into a supported container (14 × 14 × 6 inches) and the cream and rise times are recorded. When the rise is complete, gel time may also be measured as that interval of time from formation of the complete foam formulation to the attainment of a foam which has developed sufficient strength to be self-supporting.

Foaming Procedure I-C (Free-Rise Flexible Polyether Foam)

The manipulative steps involved in this procedure are essentially as described under Foaming Procedure I-A except that mixing is done in a 178 gallon capacity cylindrical cup at 2700 revolutions per minute, and the mixture is poured into and allowed to rise in a 14 × 14 × 6 inches container.

Foaming Procedure II (Free-Rise Rigid Foam)

The polyol, blowing agent (fluorocarbon and, when used, water) and catalyst or catalysts are weighed into a one-quart, circular cardboard cup. The container is stirred by hand to adjust the blowing agent to the proper level. The materials are then mixed for 10 seconds at 2000 revolutions per minute. The polyisocyanate reactant containing the surfactant, is poured into the cup for 5 seconds. The total mixture is then mixed for an additional 5 seconds and then poured into an 8 × 8 × 6 inches cardboard box and allowed to rise. The cream, gel, tack-free and rise times are recorded and the foams are allowed to cure overnight before cutting and determination of physical properties such as density and closed cell content. In those instances where cold age shrinkage was determined, the foam samples (after the aforementioned overnight aging) were cut into cubes (2 × 2 × 2 inches) which were then cold aged at minus 30° C. for a period of 16 to 24 hours. Volume contraction was measured by water displacement after cold aging.

In the first series of free-rise flexible polyether urethane foam preparations described under Examples 1 to 12, respective foam systems, designated herein as Foam Formulations A and B, were employed. The composition of these reaction mixtures is given in Table I which follows.

TABLE I

FOAM FORMULATIONS A AND B

| Components | Parts by Weight | |
|---|---|---|
| | A | B |
| Polyol A: A polyether triol having a Hydroxyl No. of 46, produced from glycerol, propylene oxide and ethylene oxide. | 100 | 100 |
| Polyisocyanate A: A mixture of the 2,4- and 2,6-isomers of tolylene diisocyanate present in a weight ratio of 80:20, respectively. (Index = 105) | 48 | 38 |
| Water | 4.0 | 3.0 |
| Stannous octoate | 0.3 | 0.3 |
| Surfactant A[1] | 1.0 | 1.0 |
| Amine catalyst[2] | —Varied— | |

[1]A polysiloxane-polyoxyalkylene block copolymer having the average composition, $Me_2SiO(Me_2SiO)_{72}[MeO(C_3H_6O)_{29}(C_2H_4O)_{20}C_3H_6SiMeO]_{5.1}$ $SiMe_3$ where Me is methyl, employed as a 55 weight per cent active solution.
[2]The specific amine catalysts and the concentration thereof are as given in Tables II and III, respectively.

EXAMPLES 1–6

In accordance with these examples, two series of water-blown urethane foams were prepared employing in one series, 2-(2-dimethylaminoethoxy)ethanol (DMEE), and in the second series, 2-[2-(2-dimethylaminoethoxy)-ethoxy]ethanol (DMEEE), as the respective sole amine catalyst component of Foam Formulation A (Table I). In each series, the amine catalyst was evaluated at three different concentrations, namely 0.15, 0.30 and 0.45 p.p.h.p. For the purpose of comparison, another series of foams was prepared as Run Nos. C-1 to C-3 employing dimethylethanolamine (DMEA) at corresponding concentrations as the sole amine catalyst component of Foam Formulation A. In each of these foam preparations, Foam Procedure I-A was followed. The results are given in Table II which follows.

TABLE II

| FREE-RISE FLEXIBLE POLYETHER FOAM (4 parts Water) | | | | | | | | | |
|---|---|---|---|---|---|---|---|---|---|
| Example No. | — | 1 | 2 | — | 3 | 4 | — | 5 | 6 |
| Run No. | C-1 | — | — | C-2 | — | — | C-3 | — | — |
| Foam No. | 1 | 2 | 3 | 4 | 5 | 6 | 7 | 8 | 9 |
| Foam Formulation A[1] | | | | | | | | | |

TABLE II-continued

| FREE-RISE FLEXIBLE POLYETHER FOAM (4 parts Water) | | | | | | | | | |
|---|---|---|---|---|---|---|---|---|---|
| Amine catalyst: | | | | | | | | | |
| DMEA[2], p.p.h.p. | 0.15 | — | — | 0.30 | — | — | 0.45 | — | — |
| DMEE[3], p.p.h.p. | — | 0.15 | — | — | 0.30 | — | — | 0.45 | — |
| DMEEE[4], p.p.h.p. | — | — | 0.15 | — | — | 0.30 | — | — | 0.45 |
| Amine N content, p.p.h.p. × 100 | 2.4 | 1.6 | 1.2 | 4.8 | 3.2 | 2.4 | 7.2 | 4.7 | 3.6 |
| Cream Time, seconds | ~10 | 9 | 10 | 8 | 7 | 8 | ~6 | 6 | ~6.5 |
| Rise Time, seconds | 102 | 84 | 89 | 83 | 70 | 74 | 71 | 62 | 67 |
| Porosity, SCFM | 2.0 | 3.6 | 2.0 | 4.8 | 4.7 | 4.2 | 4.1 | 5.3 | 4.7 |

[1]The other components are as defined in Table I.
[2]Dimethylethanolamine.
[3]2-(2-Dimethylaminoethoxy)ethanol.
[4]2-[2-(2-Dimethylaminoethoxy)ethoxy]ethanol.

The results of Table II demonstrate that, relative to dimethylethanolamine (DMEA), the amino ether alcohols, DMEE and DMEEE, exhibit greater activity as catalysts for forming water-blown polyether urethane foam when compared on either a parts by weight basis or a contained amino nitrogen basis. Thus in Examples 1 and 2 the rise times achieved with DMEE and DMEEE were 84 and 89 seconds, respectively, whereas, in Run C-1 with DMEA, the rise time was significantly longer (102 seconds) even though each catalyst was employed at 0.15 p.p.h.p. and even though the amino nitrogen contents provided by DMEE and DMEEE (0.016 and 0.012, respectively) were substantially lower than that provided by DMEA (0.024 p.p.h.p.). Also noteworthy is that at 0.45 p.p.h.p. of each catalyst a rise time of 71 was realized with DMEA (corresponding amino nitrogen content = 0.072 p.p.h.p.) whereas rise times of 62 and 67 seconds were achieved with DMEE and DMEEE even though the latter catalysts provided much lower amino nitrogen contents (0.047 and 0.036 p.p.h.p., respectively). Further, when compared at about the same level of contained amino nitrogen such as at 0.047 and 0.048 p.p.h.p. a rise time of 83 seconds was obtained with DMEA (Run No. C-2) whereas with DMEE the rise time was 62 seconds (Example 5). Similarly, at a contained amino nitrogen content of 0.024 p.p.h.p., DMEA provided a rise time of 102 seconds (Run C-1) whereas a rise time of 74 seconds was achieved with DMEEE (Example 4). This enhancement in catalytic activity relative to that of DMEA is unexpected from the standpoint that DMEE and DMEEE have a higher molecular weight group bonded to the tertiary amino nitrogen atom, that is, $-CH_2CH_2O-CH_2CH_2-OH$ and $-CH_2CH_2(OCH_2CH_2)_2-OH$, versus $-CH_2CH_2-OH$ in DMEA. If anything, DMEE and DMEEE would have been expected to be slower catalysts than DMEA inasmuch as the longer nitrogen-bonded chains have, in effect, diluted the dimethylamino group.

EXAMPLES 7-12

In accordance with these examples two further series of water-blown urethane foams were prepared employing in one series, DMEE, and in the second series, DMEEE, as the sole amine catalyst component of 3 parts H$_2$O Foam Formulation B (Table I). Each series included foam preparations at different levels of amine catalyst, namely, 0.4, 0.6 and 0.8 p.p.h.p. For comparision, another series of foams was prepared as Run Nos. C-4 to C-6 employing dimethylethanolamine (DMEA) as the sole amine catalyst component of Foam Formulation B. Each foam was prepared following above Foaming Procedure I-A. The results are given in Table III which follows.

TABLE III

| FREE-RISE FLEXIBLE POLYETHER FOAM (3 parts Water) | | | | | | | | | |
|---|---|---|---|---|---|---|---|---|---|
| Example No. | — | 7 | 8 | — | 9 | 10 | — | 11 | 12 |
| Run No. | C-4 | — | — | C-5 | — | — | C-6 | — | — |
| Foam No. | 10 | 11 | 12 | 13 | 14 | 15 | 16 | 17 | 18 |
| Foam Formulation B[1] | | | | | | | | | |
| Amine catalyst: | | | | | | | | | |
| DMEA[2], p.p.h.p. | 0.4 | — | — | 0.6 | — | — | 0.8 | — | — |
| DMEE[3], p.p.h.p. | — | 0.4 | — | — | 0.6 | — | — | 0.8 | — |
| DMEEE[4], p.p.h.p. | — | — | 0.4 | — | — | 0.6 | — | — | 0.8 |
| Amino N content, p.p.h.p. × 100 | 6.4 | 4.2 | 3.2 | 9.6 | 6.3 | 4.7 | 12.8 | 8.4 | 6.3 |
| Cream Time, seconds | ~10 | 8 | 8 | 7.5 | 6 | 7 | 6 | 5.5 | 6 |
| Rise Time, seconds | 105 | 87 | 93 | 86 | 75 | 82 | 80 | 72 | 76 |
| Porosity, SCFM | 2.1 | 3.0 | 3.7 | 3.0 | 4.2 | 4.1 | 3.8 | 4.4 | 4.6 |

[1]The other components are as defined in Table I.
[2]Dimethylethanolamine.
[3]2-(2-Dimethylaminoethoxy)ethanol.
[4]2[2-(2-Dimethylaminoethoxy)ethoxy]ethanol.

The results of Table III further demonstrate the unexpectedly higher catalytic activity of DMEE and DMEEE in providing water-blown polyether foam relative to dimethylethanolamine when compared on either a parts by weight or contained amino nitrogen basis. Further, and as recognized to its use, 3 parts water Foam Formulation B is a more difficult reaction mixture to foam to a high porosity product than a corresponding 4 parts H$_2$O system such as Foam Formulation A of Table I. It is noteworthy, therefore, that although the respective foams produced with DMEA in comparative runs C-4 to C-6 were of acceptable porosity, in each instance corresponding foams provided with DMEE and DMEEE had significantly higher porosities.

EXAMPLES 13-16

The purpose of these examples is to illustrate the efficacy of "DMEEE-R" as a catalyst for cellular urethane formation. As previously described herein, DMEEE-R is a normally liquid fraction obtained by distillation of residual product formed in the production of DMEE by the oxyethylation of dimethylethanolamine (DMEA). The particular DMEEE-R employed in this example was taken as the fraction which distilled at 96° to 140° C. and 5 millimeters of mercury pressure. Analysis of this distillate by vapor phase chromatography indicated that it contained about 70 to 75 weight percent of DMEEE, about 13 weight percent of DMEE and about 10 to 15 weight percent of other components which have not been identified. In these examples, the said DMEEE-R was employed as the amine catalyst component of a water-blown polyether polyol-containing reaction mixture, referred to herein as Foam Formulation C, the other components of which are as identified in the following Table IV.

TABLE IV

FOAM FORMULATION C

| Component | Parts by Weight |
| --- | --- |
| Polyol A [1] | 100 |
| Polyisocyanate A [1] | 49.0 (Index 107) |
| Water | 4.0 |
| Stannous octoate | 0.225 |
| Surfactant A [1] | 1.0 |
| Amine catalyst | Varied |

[1] As defined in Table I.

For the purpose of comparison, another series of foams was prepared as Run Nos. C-7 through C-10 in which dimethylethanolamine (DMEA) was employed as the amine catalyst of Foam Formulation C. The foams were prepared following above-described Foaming Procedure I-B. The results of these examples and comparative runs are given in Table V which follows.

EXAMPLES 17-20

In accordance with these examples a further series of water-blown flexible foams was prepared employing a blended amine catalyst system of the present invention as the amine catalyst of Foam Formulation C of Table IV. The particular blend employed is referred to herein as Blend I and was constituted of: (1) 40 weight percent of the same DMEEE-containing distilled residue product employed in Examples 13–16, that is, DMEE-R; and (2) 60 weight percent of the further distilled residue product referred to herein as "BDMEE-R". As previously described, the latter material is distillate (boiling range, 85°–180° C. at 1–2 mm. mercury pressure) obtained by distillation of heavier residual products formed in the manufacture of bis[2-(N,N-dimethylamino)ethyl]ether by the nickel-catalyzed reaction of trimethylamine and DMEE at, for example, a mole ratio of about 3:1 and a temperature of about 180° C. For the purpose of comparison, two further series of foams were prepared as Run Nos. C-11 to C-18. In one series (Run Nos. C-12, -14, -16 and -18), an amine catalyst blend containing 40 weight percent of DMEA and 60 weight percent of BDMEE-R was employed as the amne catalyst component of Foam Formulation C; this particular binary blend is referred to as Blend A and as such is not of the present invention. In the second series of comparative runs, a 70 weight percent solution of bis[2-(N,N-dimethylamino)ethyl]ether was employed as the amine catalyst of the same formulation. The foams of the examples and comparative runs were prepared following Foaming Procedure I-B. The results are give in Table VI which follows.

TABLE V

FREE-RISE FLEXIBLE POLYETHER FOAM

| Example No. | — | 13 | — | 14 | — | 15 | — | 16 |
| --- | --- | --- | --- | --- | --- | --- | --- | --- |
| Run No. | C-7 | — | C-8 | — | C-9 | — | C-10 | — |
| Foam No. | 19 | 20 | 21 | 22 | 23 | 24 | 25 | 26 |
| Foam Formulation C[1] | | | | | | | | |
| Amine catalyst: | | | | | | | | |
|   DMEA[2], p.p.h.p. | 0.05 | — | 0.08 | — | 0.11 | — | 0.14 | — |
|   DMEEE-R[3], p.p.h.p. | — | 0.05 | — | 0.08 | — | 0.11 | — | 0.14 |
| Cream time, seconds | 10 | 8 | 10 | 7 | 9 | 7 | 9 | 7 |
| Rise time, seconds | 112 | 108 | 108 | 103 | 104 | 100 | 100 | 96 |
| Gel time, seconds | 125 | 123 | 120 | 119 | 115 | 118 | 111 | 108 |

[1] The other components are as identified in Table IV.
[2] Dimethylethanolamine.
[3] Distilled residue containing about 70-75 weight percent of 2-[2-(2-dimethylamino)ethoxy)ethoxy]ethanol.

TABLE VI

FREE-RISE FLEXIBLE POLYETHER FOAM

| Example No. | — | — | 17 | — | — | 18 | — | — | 19 | — | — | 20 |
| --- | --- | --- | --- | --- | --- | --- | --- | --- | --- | --- | --- | --- |
| Run No. C- | 11 | 12 | — | 13 | 14 | — | 15 | 16 | — | 17 | 18 | — |
| Foam No. | 27 | 28 | 29 | 30 | 31 | 32 | 33 | 34 | 35 | 36 | 37 | 38 |
| Foam Formulation C[1] | | | | | | | | | | | | |
| Amine catalyst: | | | | | | | | | | | | |
|   BDMEE[2], p.p.h.p. | 0.05 | — | — | 0.08 | — | — | 0.11 | — | — | 0.14 | — | — |
|   Blend A[3], p.p.h.p. | — | 0.05 | — | — | 0.08 | — | — | 0.11 | — | — | 0.14 | — |
|   Blend I[4], p.p.h.p. | — | — | 0.05 | — | — | 0.08 | — | — | 0.11 | — | — | 0.14 |
| Cream time, seconds | 8 | 8 | 8 | 7 | 8 | 8 | 7 | 8 | 7 | 5 | 7 | 7 |
| Rise time, seconds | 94 | 102 | 99 | 83 | 96 | 94 | 76 | 92 | 91 | 69 | 88 | 87 |
| Gel time, seconds | 107 | 113 | 109 | 95 | 107 | 104 | 85 | 102 | 101 | 75 | 98 | 96 |

[1] Other components are as defined in Table IV.
[2] Bis[2-(N,N-dimethylamino)ethyl]ether employed as a 70 weight percent solution in dipropylene glycol.
[3] A 60/40 weight percent blend of BDMEE-R/DMEA; this blend is not of the present invention.
[4] A 60/40 weight percent blend of BDMEE-R/DMEEE-R.

The results of Table V demonstrate the efficacy of DMEE-R as a catalyst for the formation of water-blown flexible foam, the activity thereof being at least as good and, overall, somewhat faster than that of neat DMEA.

The reactivity data of Table VI further demonstrate that in blended systems comprising BDMEE-R, the replacement of DMEA with DMEEE-R allows for the utilization of a combination of two residual products without sacrifice in reactivity. Also noteworthy is that, at the low concentration (0.05 p.p.h.p.) employed in Example 17, Blend I of this invention exhibited reactivity which compared favorably with that of the 70 weight percent solution of the bis-ether which, as is well known, is one of the more highly reactive amine catalysts employed in flexible polyether foam manufacture.

EXAMPLES 21–38

These exampls illustrate the catalytic effectiveness of ternary amine catalyst systems of the present invention comprising 2-(2-dimethylaminoethoxy)ethanol (DMEE). The blends used in Examples 21–28 contained DMEE, BDMEE-R (which is as described under Examples 17–20) and, as the third amine component, either bis[2-(N,N-dimethylamino)ethyl]ether (BDMEE) or dimethylethanolamine (DMETA). These particular blends are referred to herein as Blends II and III, respectively. Examples 34–38 illustrate the performance of the ternary amine blends of the invention when used as solutions in dipropylene glycol ("DPG"). For this purpose, blends were prepared by forming respective 53 and 55 weight percent solutions of Blend II in dipropylene glycol; these particular solutions are designated herein as Blends IV and V, respectively. The composition of these various blends is given in the following Table VII wherein the weight percentages are based on the combined total weight of the components contained in the blend.

TABLE VII

|  | Component | Weight % |
|---|---|---|
| Blend II: | BDMEE-R | 72.5 |
|  | DMEE | 15.0 |
|  | BDMEE | 12.5 |
| Blend III: | BDMEE-R | 60 |
|  | DMEE | 20 |
|  | DMEA | 20 |
| Blend IV: | BDMEE-R | 38.4 |
|  | DMEE | 8 |
|  | BDMEE | 6.6 |
|  | DPG | 47 |
| Blend V: | BDMEE-R | 40 |
|  | DMEE | 8 |
|  | BDMEE | 7 |
|  | DPG | 45 |

The blends described in Table VII were employed as the amine catalyst component of a 3.0 parts water-blown flexible polyether urethane foam-producing reaction mixture, referred to as Foam Formulation D. The other components of the formulation are given in Table VIII which follows.

TABLE VIII

FOAM FORMULATION D

| Component | Parts By weight |
|---|---|
| Polyol A/1/ | 100 |
| Polyisocyanate/1/ | 38.1 (Index 105) |
| Water | 3.0 |
| Stannous octoate | 0.225 |
| Surfactant B/2/ | 1.0 |
| Amine catalyst | Varied |

/1/As defined in Table I.
/2/Silicone Surfactant L-6202 (Union Carbide Corporation).

The foams of these examples were prepared following Foaming Procedure I-C. The results obtained employing Blends II and III are given in Table IX. The latter table also includes foam data as Run Nos. C-19 through C-22 based on the use of a 33 weight percent solution of triethylenediamine ("TEDA" or DABCO) in dipropylene glycol as the amine component of Foam Formulation D. As is well known, the said triethylenediamine solution employed as a standard in Run Nos. C-19 through C-22, is one of the more highly active catalysts used for commercial manufacture of water-blown polyether urethane foam. The foams of the C-runs were prepared with the foam series of Examples 21–24 only, also following Foaming Procedure I-C. The results obtained with Blends IV aand V which contained dipropylene glycol, are given in Table X. The latter table also includes another series of foam preparation based on Blend II which did not contain dipropylene glycol. Tables IX and X follow.

TABLE IX

TERNARY AMINE BLENDS CONTAINING DMEE AS CATALYSTS FOR WATER-BLOWN POLYETHER FOAM

| Example No. | 21 | — | 22 | — | 23 | — | 24 | — | 25 | 26 | 27 | 28 |
|---|---|---|---|---|---|---|---|---|---|---|---|---|
| Run No. C- | — | 19 | — | 20 | — | 21 | — | 22 | — | — | — | — |
| Foam No. | 39 | 40 | 41 | 42 | 43 | 44 | 45 | 46 | 47 | 48 | 49 | 50 |
| Foam Formulation D[1] |  |  |  |  |  |  |  |  |  |  |  |  |
| Amine catalyst: |  |  |  |  |  |  |  |  |  |  |  |  |
| TEDA[2], p.p.h.p. | — | 0.10 | — | 0.15 | — | 0.20 | — | 0.30 | — | — | — | — |
| Blend II[3], p.p.h.p. | 0.05 | — | 0.10 | — | 0.15 | — | 0.20 | — | — | — | — | — |
| Blend III[3], p.p.h.p. | — | — | — | — | — | — | — | — | 0.05 | 0.10 | 0.15 | 0.20 |
| Cream time, seconds | 11–12 | 12 | 10–11 | 11–12 | 10 | 10–11 | 9–10 | 8–9 | 12 | 11 | 10–11 | 8–9 |
| Rise time, seconds | 128 | 123 | 117 | 115 | 101 | 109 | 97 | 99 | 122 | 111 | 102 | 98 |
| Height of rise, inches | 6.4 | 6.4 | 6.4 | 6.4 | 6.5 | 6.4 | 6.4 | 6.4 | 6.5 | 6.4 | 6.4 | 6.4 |
| Breathability, SCFM | 2.8 | 3.75 | 4.0 | 4.25 | 4.0 | 4.0 | 4.25 | 3.75 | 4.0 | 3.5 | 4.25 | 4.50 |
| Density, lbs./cu. ft. | 1.92 | 1.90 | 1.92 | 1.90 | 1.90 | 1.92 | 1.90 | 1.93 | 1.87 | 1.90 | 1.92 | 1.90 |

[1]As defined in Table VIII.
[2]Triethylenediamine employed as a 33 weight percent solution in dipropylene glycol.
[3]As defined in Table VII.

TABLE X

TERNARY AMINE BLENDS CONTAINING DMEE AS CATALYSTS FOR WATER-BLOWN POLYETHER FOAM

| Example No. | 29 | 30 | 31 | 32 | 33 | 34 | 35 | 36 | 37 | 38 |
|---|---|---|---|---|---|---|---|---|---|---|
| Foam No. | 51 | 52 | 53 | 54 | 55 | 56 | 57 | 58 | 59 | 60 |
| Foam Formulation D[1] |  |  |  |  |  |  |  |  |  |  |
| Amine catalyst: |  |  |  |  |  |  |  |  |  |  |
| Blend II[2], p.p.h.p. | 0.05 | 0.10 | 0.14 | 0.15 | 0.20 | — | — | — | — | — |
| Blend IV[2], p.p.h.p. | — | — | — | — | — | 0.15 | 0.20 | 0.25 | 0.30 | — |
| Blend V[2], p.p.h.p. | — | — | — | — | — | — | — | — | — | 0.25 |
| Cream time, seconds | 12–13 | 12 | 12 | 12 | 10–11 | 12 | 12 | 11–12 | 10–11 | 11 |
| Rise time, seconds | 144 | 129 | 117 | 114 | 106 | 125 | 122 | 114 | 109 | 112 |
| Height of rise, inches | 6.3 | 6.3 | 6.3 | 6.3 | 6.4 | 6.2 | 6.3 | 6.3 | 6.3 | 6.3 |
| Breathability, SCFM | 4.00 | 4.75 | 4.50 | 4.50 | 4.50 | 4.50 | 4.50 | 4.50 | 4.25 | 4.50 |

TABLE X-continued
TERNARY AMINE BLENDS CONTAINING DMEE AS CATALYSTS FOR WATER-BLOWN POLYETHER FOAM

| Density, lbs./cubic foot | 1.93 | 1.91 | 1.92 | 1.91 | 1.90 | 1.92 | 1.88 | 1.90 | 1.91 | 1.90 |

[1]As defined in Table VIII.
[2]As defined in Table VII.

As demonstrated by the data of Table IX, DMEE-containing Blends II and III exhibited good overall performance. These illustrative blends of the invention offer the advantages of being comprised of low odor, normally liquid components and allow for utilization of by-product (BDMEE-R) formed in the manufacture of bis[2-(N,N-dimethylamino)ethyl]ether which latter catalyst is also a highly active but relatively expensive urethane blowing catalyst. The data of Table X demonstrate that the ternary amine blends of the invention as illustrated by Blend II, for example, may also be employed in dilute form without sacrifice of overall performance. Thus in Example 35, Blend IV was employed at 0.20 p.p.h.p. corresponding to about 0.11 p.p.h.p. of total amine content, and provided a rise time of 122 seconds, a height of rise of 6.3 inches and a breathability value of 4.50. This compares favorably with the results of Example 30 in which 0.10 p.p.h.p. of corresponding undiluted Blend II provided a rise time of 129 seconds, a height of rise of 6.3 inches and a breathability value of 4.75. Similarly, in Example 36, Blend IV was employed at 0.25 p.p.h.p. corresponding to about 0.13 p.p.h.p. of total amine content and provided results which compare favorably with those of Example 31 in which Blend II was used at 0.14 p.p.h.p.

EXAMPLES 39–50

These examples illustrate the catalytic effectiveness of blends within the scope of the invention containing 2-(2-dimethylaminoethoxy)ethanol (DMEE) in combination with hydrocarbyl polyamines referred to for brevity as "PMDETA" and "TMBDA" where:

PMDETA = 1,1,4,7,7-pentamethyldiethylenetriamine which has the formula,

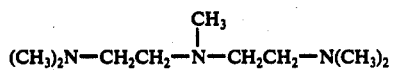

TMBDA = N,N,N',N'-tetramethyl,1,3-butanediamine which has the formula,

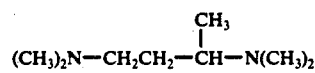

The blended catalysts of the invention are referred to herein as Blends VI and VII. For the purpose of comparison, the standard chosen for these foam preparations was a blend, designated Blend B, of BDMEE and DMEA where:

BDMEE = bis[2-(N,N-dimethylamino)ethyl]ether.
DMEA = N,N-dimethylethanolamine.

Blend B was employed in Run Nos. C-23 to C-28. The composition of comparative Blend B, and of Blends VI and VII of the invention, are given in the following Table XI.

TABLE XI

|           | Component | Weight % |
|-----------|-----------|----------|
| Blend B:  | BDMEE     | 33.3     |
|           | DMEA      | 66.7     |
| Blend VI: | PMDETA    | 55       |
|           | DMEE      | 45       |
| Blend VII:| TMBDA     | 55       |
|           | DMEE      | 45       |

In one series of foam preparations, that is, in Examples 39–44 and Run Nos. C-23 to C-25, the respective blends were used as the amine catalyst component of 4 parts water Foam Formulation A of Table I. In the second series, that is, in Examples 45–50 and Run Nos. C-26 to C-28, the respective blends were used as the amine catalyst component of 3 parts water Foam Formulation B which is also defined in Table I. In both series, Foam Procedure I-A was followed. The results are give in Tables XII and XIII which follow.

TABLE XII
BLENDS OF DMEE WITH HYDROCARBYL POLYAMINES FOR WATER-BLOWN FLEXIBLE POLYETHER FOAM

| Example No. | — | 39 | 40 | — | 41 | 42 | — | 43 | 44 |
|---|---|---|---|---|---|---|---|---|---|
| Run No. C- | 23 | — | — | 24 | — | — | 25 | — | — |
| Foam No. | 61 | 62 | 63 | 64 | 65 | 66 | 67 | 68 | 69 |
| Foam Formulation A[1] | | | | | | | | | |
| Blend B[2,3], p.p.h.p. | 0.1 | — | — | 0.2 | — | — | 0.3 | — | — |
| Blend VI[3], p.p.h.p. | — | 0.1 | — | — | 0.2 | — | — | 0.3 | — |
| Blend VII[3], p.p.h.p. | — | — | 0.1 | — | — | 0.2 | — | — | 0.3 |
| Cream time, seconds | 8 | 8 | 9 | ~6 | 6 | 7 | ~5 | 5 | 6 |
| Rise time, seconds | 82 | 76 | 81 | 67 | 63 | 69 | 58 | 55 | 63 |
| Foam porosity, SCFM | 1.8 | 2.6 | 2.9 | 3.3 | 4.0 | 4.6 | 3.8 | 5.2 | 4.5 |

[1]Four parts water system as defined in Table I.
[2]Not a blend of the present invention.
[3]As defined in Table XI.

TABLE XIII
BLENDS OF DMEE WITH HYDROCARBYL POLYAMINES FOR WATER-BLOWN FLEXIBLE POLYETHER FOAM

| Example No. | — | 45 | 46 | — | 47 | 48 | — | 49 | 50 |
|---|---|---|---|---|---|---|---|---|---|
| Run No. C- | 26 | — | — | 27 | — | — | 28 | — | — |
| Foam No. | 70 | 71 | 72 | 73 | 74 | 75 | 76 | 77 | 77A |
| Foam Formulation B[1] | | | | | | | | | |
| Blend B[2,3], p.p.h.p. | 0.1 | — | — | 0.2 | — | — | 0.3 | — | — |
| Blend VI[3], p.p.h.p. | — | 0.1 | — | — | 0.2 | — | — | 0.3 | — |
| Blend VII[3], p.p.h.p. | — | — | 0.1 | — | — | 0.2 | — | — | 0.3 |
| Cream time, seconds | 12 | 10 | 13 | 8 | 6 | 9 | 6 | 5 | 7 |
| Rise time, seconds | 136 | 106 | 116 | 104 | 84 | 96 | 80 | 72 | 86 |
| Foam porosity, SCFM | 0.71 | 1.1 | 0.5 | 1.9 | 3.1 | 2.1 | 3.4 | 3.5 | 2.8 |

[1]Three parts water system as defined in Table I.
[2]Not a blend of the invention.
[3]As defined in Table XI.

The data of Tables XII and XIII illustrate the utility of blends of DMEE with the generally more odoriferous hydrocarbyl polyamines such as TMBDA and PMDETA to produce well cured "one-shot" flexible polyether polyurethane foam with an acceptable processing time. The use of the relatively non volatile DMEE as a blend component allows more volatile or odorous amine catalysts such as TMBDA and PMDETA to be employed for their catalytic activity while keeping catalyst vapors reduced. The data of Tables XII and XIII also illustrate that the use of DMEE in combination with PMDETA as in Blend VI, provides an amine catalyst system for water-blown polyether urethane foam formation having an especially good combination of catalytic activity and ability to provide open foam.

EXAMPLES 50A, 51 and 52

In these examples, free-rise rigid foams blown with a combination of fluorocarbon and water were prepared employing DMEE as the amine catalyst component of the foam-producing reaction mixture. The other components of the reaction mixture are as identified in Table XIV.

TABLE XIV

| FOAM FORMULATION E | |
|---|---|
| Component | Parts By Weight |
| Polyol B: A polyol having a Hydroxyl No. of about 400, derived from ethylene oxide and propylene oxide and a mixed starter containing sucrose, diethylenetriamine and aniline. | 100 |
| Polyisocyanate B: Contains (1) isocyanate having a free -NCO content of about 38.5 weight percent, produced as a residue product in the manufacture of the 2,4- and 2,6- isomers of tolylene diisocyanate, and (2) a silicone surfactant; the weight ratio of (1):(2) is 98.2./1/ | 99.9 |
| Blowing Agent: | |
| Water | 1.5 |
| Trichlorofluoromethane | 45.0 |
| Catalyst system | Varied |

/1/Surfactant component (2) is Silicone Surfactant L-5340 (Union Carbide Corporation).

In these examples, the DMEE was employed as the hole catalyst of Foam Formulation E at 1.0, 2.0 and 3.0 p.p.h.p. Foams were also prepared based on the use of dimethylethanolamine (Run Nos. C-29, -31 and -33) and triethylamine (Run Nos. C-30, and -32 and -34) as the respective catalyst components of Foam Formulation E at corresponding concentrations of 1.0, 2.0 and 3.0 p.p.h.p. Each foam preparation followed Foaming Procedure II. The results are given in Table XV which follows.

As in the case of its employment in the formation of water-blown flexible polyether foam, the data of Table XV indicate that, relative to DMEA (as well as triethylamine), DMEE also exhibits an overall enhanced reactivity as a catalyst in forming rigid foam partially blown with water. This improvement is realized when compared on either a parts by weight or contained amino nitrogen basis. For example, on a parts by weight basis, the rise times achieved with DMEE in Examples 50A, 51 and 52 at a concentration of 1.0, 2.0 and 3.0 p.p.h.p. were 216, 183 and 155 seconds, respectively, whereas with DMEA employed in Runs C-29, -31 and -33, the rise times at corresponding concentrations were about 300, 203 and 173, respectively. Similarly, in Example 52, DMEE provided an amino nitrogen content of 0.32 p.p.h.p. and a rise time of 155 seconds whereas in Run C-31, DMEA provided a rise time of 203 seconds at about the same amino nitrogen content of 0.31 p.p.h.p. It is also noted that DMEE provided a satisfactory cure and acceptable closed cell content which are significant features of rigid urethane foam.

EXAMPLES 53-55

In accordance with these examples, 2-(2-dimethylaminoethoxy)ethanol (DMEE) was employed as the sole amine catalyst of an all fluorocarbon-blown rigid foam formulation. The particular reaction mixture employed is designated as Foam Formulation F and contained the components given in Table XVI.

TABLE XVI

| FOAM FORMULATION F | |
|---|---|
| Component | Parts By Weight |
| Polyol B/1/ | 100 |
| Polyisocyanate B/1/ | 99.9 |
| Blowing Agent: | |
| Water | 0.0 |
| Trichlorofluoromethane | 56.4 |
| Catalyst system | Varied |

/1/Same as in Foam Formulation E of Table XIV.

The rigid foams of these examples were prepared following free-rise Foaming Procedure II, employing DMEE at a concentration of 1.0, 2.0 and 3.0 p.p.h.p., respectively. Another series of all fluorocarbon blown rigid foams were provided following Foaming Procedure II employing dimethylethanolamine (DMEA) as the sole amine catalyst component of Foam Formulation F, also at 1.0, 2.0 and 3.0 p.p.h.p. (Run Nos. C-35 to

TABLE XV

| FREE-RISE RIGID POLYETHER FOAM BLOWN WITH WATER + FLUOROCARBON | | | | | | | | | |
|---|---|---|---|---|---|---|---|---|---|
| Example No. | — | — | 50A | — | — | 51 | — | — | 52 |
| Run No. C- | 29 | 30 | — | 31 | 32 | — | 33 | 34 | — |
| Foam No. | 77B | 77C | 77D | 77E | 77F | 77G | 77H | 77I | 77J |
| Foam Formulation E[1] | | | | | | | | | |
| Amine catalyst: | | | | | | | | | |
| DMEA[2], p.p.h.p. | 1.0 | — | — | 2.0 | — | — | 3.0 | — | — |
| TEA[3], p.p.h.p. | — | 1.0 | — | — | 2.0 | — | — | 3.0 | — |
| DMEE[4], p.p.h.p. | — | — | 1.0 | — | — | 2.0 | — | — | 3.0 |
| Amino nitrogen content, p.p.h.p. | 0.16 | 0.14 | 0.11 | 0.31 | 0.28 | 0.21 | 0.47 | 0.42 | 0.32 |
| Cream time, seconds | ~19 | 16 | 15 | ~13 | 12 | 10 | ~12 | 10 | 7 |
| Gel time, seconds | 135 | 146 | 129 | 82 | 113 | 89 | 66 | 79 | 68 |
| Tack-free time, seconds | 140 | 140 | 128 | 94 | 113 | 91 | 74 | 84 | 69 |
| Rise time, seconds | ~300 | 220 | 216 | 203 | 193 | 183 | 173 | 158 | 155 |
| Foam density, lbs./cu.ft. | 1.34 | 1.35 | — | 1.34 | 1.24 | 1.22 | 1.24 | 1.27 | — |
| Closed cells, percent | 83.5 | 83.7 | — | 79.4 | 83.6 | 85.7 | 83.9 | 87.0 | — |

[1]The other components are as defined in Table XIV.
[2]Dimethylethanolamine.
[3]Triethylamine.
[4]2-(2-Dimethylaminoethoxy)ethanol.

C-37, respectively). The results are given in Table XVII which follows.

TABLE XVII
ALL FLUOROCARBON-BLOWN FREE-RISE RIGID POLYETHER FOAM

| Example No. | — | 53 | — | 54 | — | 55 |
|---|---|---|---|---|---|---|
| Run No. | C-35 | — | C-36 | — | C-37 | — |
| Foam No. | 78 | 79 | 80 | 81 | 82 | 83 |
| Foam Formulation F[1] | | | | | | |
| Amine catalyst: | | | | | | |
| DMEA[2], p.p.h.p. | 1.0 | — | 2.0 | — | 3.0 | — |
| DMEA[3], p.p.h.p. | — | 1.0 | — | 2.0 | — | 3.0 |
| Amino nitrogen content, p.p.h.p. | 0.16 | 0.11 | 0.31 | 0.21 | 0.47 | 0.32 |
| Cream time, seconds | 24 | 24 | 15 | 17 | 11 | 13 |
| Gel time, seconds | 184 | 215 | 115 | 146 | 90 | 100 |
| Tack-free time, seconds | 202 | 215 | 120 | 145 | 95 | 95 |
| Rise time, seconds | 278 | 268 | 196 | 242 | 175 | 189 |
| Foam density, lbs.cu.ft. | 1.54 | 1.57 | 1.44 | 1.49 | 1.38 | 1.45 |
| Closed cells, percent | 86.8 | 86.9 | 88.1 | 87.2 | 87.2 | 87.0 |

[1]The other components are as defined in Table XVI.
[2]Dimethylethanolamine.
[3]2-(2-Dimethylaminoethoxy)ethanol.

The results of Table XVII illustrate the utility of 2-(2-dimethylaminoethoxy)ethanol (DMEE) as a catalyst in forming all fluorocarbon-blown rigid foam having an acceptable closed cell content. As discussed with specific reference to the rigid foam data of Table XV, when compared with DMEA on either a parts by weight or contained amino nitrogen basis, DMEE exhibits enhanced reactivity as a catalyst for forming rigid foam blown with fluorocarbon and water. On the other hand and as indicated by the data of TAble XVII, when the blowing agent does not comprise water, DMEE appears less active than DMEA when the comparison is made on a parts by weight basis. Further, when compared at about the same amino nitrogen content as in the case of Example 55 (0.32 p.p.h.p. as DMEE) and Run C-36 (0.31 p.p.h.p. as DMEA), the respective rise times are 189 and 196 which for all fluorocarbonblown rigid foam preparations may be considered about the same.

EXAMPLES 56-58

The purpose of these examples is to illustrate the use of "DMEEE-R" as a catalyst for forming rigid urethane foam. As previously described herein, DMEEE-R is a normally liquid fraction obtained by distillation of residual product formed in the production of 2-(2-dimethylaminoethoxy)ethanol (DMEE) by the oxyethylation of dimethylethanolamine at, for example, a mole ratio of DMEA:ethylene oxide of between about 7:1 and about 9:1, a reaction temperature from about 140° to about 160° C. and autogenous pressure. The particular DMEEE-R employed in the foam preparations of these examples is distillate having a typical boiling range from about 120° to about 140° C. at 10 mm. of mercury pressure, and, for convenience, is referred to herein as DMEEE-R-1. Analysis by nuclear magnetic resonance, appears to indicate that this material contains approximately 65 weight percent of 2-[2-(2-dimethylaminoethoxy)ethoxy]-ethanol. Although the remainder has not been identified, it is believed that the most likely principal components are various linear ethoxylated derivatives of dimethyl and monomethyl amines. In these examples, the said DMEEE-R-1 was employed as the catalyst component of Foam Formulation F (Table XVI) at a concentration of 1.0, 2.0 and 3.0 p.p.h.p., and the foams were prepared in accordance with Foaming Procedure II. The results are given in Table XVIII which follows.

TABLE XVIII

| Example No. | 56 | 57 | 58 |
|---|---|---|---|
| Foam No. | 84 | 85 | 86 |
| Foam Formulation F[1] | | | |
| Amine catalyst: | | | |
| DMEEE-R-1[2], p.p.h.p. | 1.0 | 2.0 | 3.0 |
| Cream time, seconds | 25 | 18 | 15 |
| Gel time, seconds | 277 | 184 | 134 |
| Tack-free time, seconds | 290 | 192 | 144 |
| Rise time, seconds | ~400 | ~335 | 250 |
| Foam density, lbs./cu.ft. | 1.57 | 1.44 | 1.42 |
| Closed cells, percent | 81.8 | 86.1 | 87.5 |

[1]The other components are as defined in Table XVI.
[2]Distilled residue containing approximately 65 weight percent of 2-[2-(2-dimethylaminoethoxy)ethoxy]ethanol; boiling range = 120°-140° C./10 mm.

The results of Table XVIII show that the normally liquid residual product containing 2-([2-(2dimethylaminoethoxy)ethoxy]ethanol (that is, distillate containing a major proportion by weight of DMEEE) is also catalytically effective in forming all fluorocarbon blown rigid polyurethane foam of acceptable closed cell content.

EXAMPLES 59-61

These examples illustrate the use of 2-(2-dimethylaminoethoxy)ethanol (DMEE) in preblended form with an organic compound of tin for the formation of rigid form blown with fluorocarbon alone or in combination with water. The particular blend employed in these examples is referred to as Blend VIII and contained 95 parts by weight of DMEE and 5 parts by weight of dibutyltin dilaurate. In Example 59, Blend VIII was employed as the catalyst system of all fluorocarbon blown Foam Formulation F (Table XVI) at a concentration of 1.5 p.p.h.p. In Examples 60 and 61, Blend VIII was used as the catalyst system of water/fluorocarbon blown Foam Formulation E (Table XIV) at a concentration of 1.0 and 1.5 p.p.h.p., respectively. As a standard, a 33 weight percent solution of triethylenediamine ("TEDA") in dipropylene glycol was also used at corresponding concentrations as the catalyst component of Foam Formulation F (Run No. C-38) and Foam Formulation e (Run Nos. C-39 and C-40). Each foam was prepared following freerise rigid Foaming Procedure II. The results are given in Table XIX which follows.

TABLE XIX
BLEND OF DMEE AND TIN COMPOUND FOR FREE-RISE RIGID FOAM

| Example No. | — | 59 | — | — | 60 | 61 |
|---|---|---|---|---|---|---|
| Run No. | C-38 | — | C-39 | C-40 | — | — |
| Foam No. | 87 | 88 | 89 | 90 | 91 | 92 |
| Foam Formulation | F[1] | | | E[2] | | |
| Catalyst system: | | | | | | |
| TEDA[3], p.p.h.p. | 1.5 | — | 1.0 | 1.5 | — | — |
| Blend VIII[4], p.p.h.p. | — | 1.5 | — | — | 1.0 | 1.5 |
| Cream time, seconds | 16 | 18 | 13 | 11 | 14 | 11 |
| Gel time, seconds | 76 | 100 | 88 | 77 | 75 | 60 |
| Tack-free time, seconds | 77 | 115 | 89 | 77 | 85 | 73 |
| Rise time, seconds | 172 | 188 | 199 | 163 | 158 | 129 |
| Cold age shrinkage, % | — | — | 11.7 | — | 16.3 | — |

[1]As defined in Table XVI.
[2]As defined in Table XIV.
[3]Triethylenediamine employed as a 33 weight percent solution in dipropylene glycol.
[4]95/5 blend of DMEE/dibutyltin dilaurate.

Preliminary to the discussion of the data of Table XIX, it is noted that the triethylenediamine solution used as a standard in Run Nos. C-38 to C-40 is a widely used amine catalyst in the commercial manufacture of both partially water blown and all fluorocarbon blown rigid foam. The objective, therefore, is to provide catalysts the performance of which, in all fluorocarbonblown systems, at least approaches that of commercially employed catalysts such as the aforementioned solution of triethylenediamine and which, at the same time, are not too active when used to catalyze rigid foam formulations partially blown with water. In other words, a catalyst which may exhibit good performance in forming rigid foam partially blown with water may not exhibit the same relative performance in all fluorocarbon blown systems and, conversely, a catalyst which may show excellent reactivity in all fluorocarbon blown systems may be too active a catalyst when used to form partially water blown rigid foam. With specific reference to the results of Table XIX, it is seen that the prformance of Blend VIII of the invention in forming all fluorocarbon blown rigid Foam No. 88 approached that of the triethylenediamine solution employed in the formation of Foam No. 87 and, although performance surpassed that of the standard in forming partially water-blown Foams 91 and 92, Blend VIII was not too active in this respect. It is also noted that the use of Blend VIII at 1.0 p.p.h.p., as in Example 60, introduced a low level (0.05 p.p.h.p.) of dibutyltin dilaurate to the foam-producing reaction mixture, and provided a foam having an acceptable cold age shrinkage (16.3 percent) relative to that of Foam 89 (11.2 percent) produced with the standard. It is evident, therefore, that catalyst systems of the invention comprising DMEE and an organotin compound such as, in particular, dibutyltin dilaurate, have good performance latitude in rigid foam formulations.

EXAMPLES 62-74

In accordance with these examples, further illustrative blended catalyst systems of the invention were evaluated for their performance in forming rigid foams blown with fluorocarbon only and fluorocarbon in combination with water. The particular catalysts of these examples comprised DMEE and N,N,N',N'-tetramethylethylenediamine ("TMEDA") as binary blends or in further combination with dibutyltin dilaurate ("DBTDL"); their composition is given in Table XX which follows.

TABLE XX

|  | Component | Weight % |
|---|---|---|
| Blend IX: | DMEE[1] | 75 |
|  | TMEDA[2] | 25 |
| Blend X: | DMEE | 74 |
|  | TMEDA | 25 |
|  | DBTDL[3] | 1 |
| Blend XI: | DMEE | 72 |
|  | TMEDA | 25 |
|  | DBTDL | 3 |

[1]2-(2-dimethylaminoethoxy)ethanol.
[2]N,N,N',N'-tetramethylethylenediamine.
[3]Dibutyltin dilaurate.

In Examples 62–70, Blends IX, X and XI were employed as the catalyst system of all fluorocarbon-blown rigid Foam Formulation F at 1.0, 2.0 and 3.0 p.p.h.p. The results are given in Table XXI below. The latter table also includes data as Run Nos. C-41 and C-43 based on the employment of the 33 weight percent active solution of triethylenediamine as the catalyst of the same formulation, this standard solution also being used at 1.0, 2.0 and 3.0 p.p.h.p. In Examples 71–74, Blends IX and XI were evaluated as the catalyst system of partially water-blown rigid Foam Formulation E. The results are given in Table XXII which also includes corresponding data as Run Nos. C-44 to C-47 based on the 33 weight percent solution of triethylenediamine. The foams of the examples and C runs were prepared following Foaming Procedure II. Tables XXI and XXII follow.

TABLE XXI
BLENDS CONTAINING DMEE FOR ALL FLUOROCARBON BLOWN RIGID FOAM

| Example No. | — | — | — | 62 | 63 | 64 | 65 | 66 | 67 | 68 | 69 | 70 |
|---|---|---|---|---|---|---|---|---|---|---|---|---|
| Run No. | C-41 | C-42 | C-43 | — | — | — | — | — | — | — | — | — |
| Foam No. | 93 | 94 | 95 | 96 | 97 | 98 | 99 | 100 | 101 | 102 | 103 | 104 |
| Foam Formulation F[1] |  |  |  |  |  |  |  |  |  |  |  |  |
| Catalyst system: |  |  |  |  |  |  |  |  |  |  |  |  |
| TEDA[2], p.p.h.p. | 1.0 | 2.0 | 3.0 | — | — | — | — | — | — | — | — | — |
| Blend IX[3], p.p.h.p. | — | — | — | 1.0 | 2.0 | 3.0 | — | — | — | — | — | — |
| Blend X[3], p.p.h.p. | — | — | — | — | — | — | 1.0 | 2.0 | 3.0 | — | — | — |
| Blend XI[3], p.p.h.p. | — | — | — | — | — | — | — | — | — | 1.0 | 2.0 | 3.0 |
| Cream time, seconds | 20 | 13 | 5 | 16 | 13 | ~9 | 22 | 14 | 10 | 19 | 15 | 9 |
| Gel time, seconds | 105 | 70 | 48 | 168 | 120 | 80 | 170 | 85 | 65 | 122 | 80 | 55 |
| Tack-free time, seconds | 140 | 77 | 50 | 176 | 130 | 105 | 175 | 100 | 72 | 136 | 105 | 73 |
| Rise time, seconds | 214 | 150 | 95 | 243 | 206 | 168 | 295 | 156 | 123 | 235 | 160 | 117 |
| Density, lbs./cu.ft. | 1.46 | 1.41 | 1.36 | 1.47 | 1.50 | 1.43 | 1.55 | 1.43 | 1.44 | 1.46 | 1.40 | 1.39 |
| Closed cells, percent | 85.1 | 87.7 | 85.8 | 85.4 | 86.6 | 86.8 | 86.2 | 87.4 | 87.5 | 87.7 | 88 | 88.6 |

[1]The other components are as defined in Table XVI.
[2]A 33 weight percent solution of triethylenediamine in dipropylene glycol.
[3]As defined in Table XX.

TABLE XXII
BLENDS CONTAINING DMEE FOR RIGID FOAM BLOWN WITH FLUOROCARBON + WATER

| Example No. | — | — | — | 71 | 72 | 73 | — | 74 |
|---|---|---|---|---|---|---|---|---|
| Run No. | C-44 | C-45 | C-46 | — | — | — | C-47 | — |
| Foam No. | 105 | 106 | 107 | 108 | 109 | 110 | 111 | 112 |
| Foam Formulation E[1] |  |  |  |  |  |  |  |  |
| Catalyst system: |  |  |  |  |  |  |  |  |
| TEDA[2], p.p.h.p. | 1.0 | 2.0 | 3.0 | — | — | — | 1.5 | — |
| Blend IX[3], p.p.h.p. | — | — | — | 1.0 | 2.0 | 3.0 | — | — |
| Blend XI[3], p.p.h.p. | — | — | — | — | — | — | — | 1.4 |
| Cream time, seconds | 20 | 12 | 9 | 17 | 10 | 7 | 9 | ~9 |
| Gel time, seconds | 120 | 69 | 47 | 135 | 85 | 60 | 85 | 75 |
| Tack-free time, seconds | 125 | 70 | 40 | 125 | 70 | 60 | 89 | 70 |
| Rise time, seconds | 254 | 159 | 122 | 232 | 161 | 131 | 170 | 144 |
| Density, lbs./cu.ft. | — | — | — | — | — | — | — | 1.20 |

TABLE XXII-continued
BLENDS CONTAINING DMEE FOR RIGID FOAM BLOWN WITH FLUOROCARBON + WATER

| Closed cells, percent | — | — | — | — | — | — | — | 82.7 |
|---|---|---|---|---|---|---|---|---|

[1] The other components are as defined in Table XIV.
[2] A 33 weight percent solution of triethylenediamine in dipropylene glycol.
[3] As defined in Table XX.

Overall, the results of Tables XXI and XXII show that DMEE-containing Blends IX, X and XI of the invention are effective catalyst systems for forming rigid foam. More specifically, the results further show that, whereas the reactivity of binary Blend IX approached that of the standard in forming partially water-blown rigid foam, there was a greater differential in reactivity in the all fluorocarbon-blown system. (To facilitate discussion, reference is made in the following analysis of the data to the average of the rise times observed in the respective series of foam preparations.) For example, with specific reference to the data of Table XXII, in forming fluorocarbon/water blown Foams 108 to 110 with binary Blend IX and corresponding Foams 105 to 107 with the standard catalyst, the respective average rise times were about the same (175 and 178 seconds). In contrast, in forming all fluorocarbon-blown Foams 96 to 98 with binary Blend XI and corresponding Foams 93 to 95 with the standard catalyst, the average rise times are about 206 and 153, respectively. As discussed with specific reference to the data of Examples 59–61 of Table XIX, it has been found that this differential in the all fluorocarbon systems is not only substantially reduced by the addition to the DMEE-containing blend of dibutyltin dilaurate, as in Blends X and XI, but the enhancement in reactivity is achieved without sacrifice of the good processing characteristics of binary Blend IX for partially water-blown formulations. Thus, in the all fluorocarbon blown foam preparations of Table XXI, ternary Blend XI provided an average rise time (Examples 68–70) of about 171 seconds which value approaches the average rise time of 153 seconds provided by the standard catalyst in Run Nos. C-41 to C-43. Notwithstanding this desirable enhancement of reactivity for all fluorocarbonblown formulations, Blend XI is also an excellent catalyst for forming rigid foams blown with fluorocarbon in combination with water as shown by the results of Example 74 (Table XXII).

EXAMPLES 75–84

In accordance with these examples, further illustrative catalyst systems of the invention were evaluated for their performance in forming rigid foams blown with fluorocarbon only as well as fluorocarbon in combination with water. The particular catalysts of these examples comprise DMEE and 3-dimethylamino-N,N-dimethylpropionamide ("DDPS") as a binary blend (Blend XII) or in further combination with dibutyltin dilaurate (Blends XIII and XIV). The respective compositions of these catalyst systems are given in Table XXIII which follows.

TABLE XXIII

|  | Component | Weight % |
|---|---|---|
| Blend XII: | DMEE[1] | 75 |
|  | DDPA[2] | 25 |
| Blend XIII: | DMEE | 74 |
|  | DDPA | 25 |
|  | DBTDL[3] | 1 |
| Blend XIV: | DMEE | 72 |
|  | DDPA | 25 |
|  | DBTDL | 3 |

[1] 2-(2-Dimethylaminoethoxy)ethanol.
[2] 3-Dimethylamino-N,N-dimethylpropionamide which has the formula, $(CH_3)_2N-CH_2CH_2C(O)-N(CH_3)_2$.
[3] Dibutyltin dilaurate.

In the series of foam preparations of Examples 75 to 80, Blends XII, XIII and XIV were employed as the catalyst system of all fluorocarbon-blown Foam Formulation F of Table XVI. Also provided were foams catalyzed with the commercially employed 33 weight percent solution of triethylenediamine (Run Nos. C-48 and C-49), and N,N-dimethylcyclohexylamine (Run Nos. C-50 and C-51). The latter catalyst is also employed in the commercial manufacture of rigid foam. In the series of foam preparations of Examples 81 to 84, Blends XIII and XIV were used as the catalyst system of partially water-blown Foam Formulation E of Table XIV. Corresponding foams were also prepared (Run Nos. C-52 to C-55) employing the aforementioned respective amines used in commercial practice. The foams of the examples and comparative runs were formed following Foaming Procedure II. The results are given in Tables XXIV and XXV which follow.

TABLE XXIV
BLENDS CONTAINING DMEE FOR ALL FLUOROCARBON BLOWN RIGID FOAM

| Example No. | — | — | — | — | 75 | 76 | 77 | 78 | 79 | 80 |
|---|---|---|---|---|---|---|---|---|---|---|
| Run No. | C-48 | C-49 | C-50 | C-51 | — | — | — | — | — | — |
| Foam No. | 113 | 114 | 115 | 116 | 117 | 118 | 119 | 120 | 121 | 122 |
| Foam Formulation F[1] | | | | | | | | | | |
| Catalyst system: | | | | | | | | | | |
|   TEDA[2], p.p.h.p. | 1.0 | 1.25 | — | — | — | — | — | — | — | — |
|   DMCHA[3], p.p.h.p. | — | — | 1.25 | 1.5 | — | — | — | — | — | — |
|   Blend XII[4], p.p.h.p. | — | — | — | — | 1.25 | 1.5 | — | — | — | — |
|   Blend XIII[4], p.p.h.p. | — | — | — | — | — | — | 1.25 | 1.5 | — | — |
|   Blend XIV[4], p.p.h.p. | — | — | — | — | — | — | — | — | 1.25 | 1.5 |
| Cream time, seconds | 19 | 17 | 18 | 16.5 | 22 | 19 | 20 | 17.5 | 20 | 18 |
| Gel time, seconds | 115 | 93 | 130 | 119 | 154 | 142 | 120 | 109 | 105 | 97 |
| Tack-free time, seconds | 138 | 105 | 136 | 121 | 173 | 148 | 145 | 126 | 146 | 135 |
| Rise time, seconds | 231 | 185 | 240 | 222 | 281 | 252 | 230 | 205 | 210 | 195 |
| Density, lbs./cu.ft. | — | — | — | — | — | — | 1.46 | 1.44 | 1.44 | 1.40 |
| Closed cells, % | — | — | — | — | — | — | 89.7 | 85.7 | 84.3 | 85.8 |

[1] The other components are as defined in Table XVI.
[2] A 33 weight percent solution of triethylenediamine in dipropylene glycol.
[3] N,N-Dimethylcyclohexylamine.
[4] As defined in Table XXIII.

TABLE XXV
BLENDS CONTAINING DMEE FOR RIGID FOAM BLOWN WITH FLUOROCARBON + WATER

| Example No. | — | — | — | — | 81 | 82 | 83 | 84 |
|---|---|---|---|---|---|---|---|---|
| Run No. | C-52 | C-53 | c-54 | C-55 | — | — | — | — |
| Foam No. | 123 | 124 | 125 | 126 | 127 | 128 | 129 | 130 |
| Foam Formulation E[1] | | | | | | | | |
| Catalyst system: | | | | | | | | |
| TEDA[2], p.p.h.p. | 1.0 | 2.0 | — | — | — | — | — | — |
| DMCHA[3], p.p.h.p. | — | — | 1.0 | 2.0 | — | — | — | — |
| Blend XIII[4], p.p.h.p. | — | — | — | — | 1.0 | 2.0 | — | — |
| Blend XIV[4], p.p.h.p. | — | — | — | — | — | — | 1.0 | 2.0 |
| Cream time, seconds | 12 | 10 | 13 | 10 | 11 | 9 | 11.5 | 9 |
| Gel time, seconds | 95 | 64 | 102 | 66 | 100 | 64 | 84 | 56 |
| Tack-free time, seconds | 105 | 65 | 107 | 68 | 100 | 72 | 94 | 85 |
| Rise time, seconds | 192 | 141 | 205 | 149 | 183 | 127 | 153 | 111 |
| Density, lbs./cu.ft. | — | — | — | — | 1.24 | 1.19 | 1.23 | 1.20 |
| Closed cells, percent | 80.7 | 84.5 | 83.6 | 87.2 | 80.5 | 84.2 | 79.7 | 82.8 |
| Cold age shrinkage, % | 55.7 | 74.3 | 52.5 | 69 | 51.2 | 68.8 | 62.3 | 68.5 |

[1]The other components are as defined in Table XIV.
[2]A 33 weight percent solution of triethylenediamine in dipropylene glycol.
[3]N,N-dimethylcyclohexylamine.
[4]As defined in Table XXIII.

The results of Tables XXIV and XXV illustrate the utility for rigid foam formation of catalyst systems of the invention comprising 2-(2-dimethylaminoethoxy)ethanol (DMEE) in combination with 3-dimethylamino-N,Ndimethylpropionamide (DDPA). More particularly the data show that the performance latitude of DMEE in combination with DDPA is significantly improved by the presence in the blend of an organic compound of tin such as dibutyltin dilaurate, as in Blends XIII and XIV. For example, as reflected by rise time, the reactivity of Blend XIV in the all fluorocarbon-blown rigid formulation (Examples 79 and 80 of Table XXIV) approached that of the triethylenediamine solution and surpassed the reactivity of N,N-dimethylcyclohexylamine. The overall performance of Blend XIV, as well as Blend XIII, in the fluorocarbon/H$_2$O-blown formulation (Examples 81 to 84 of Table XXV) was also excellent being comparable to or better than the commercially employed catalysts. Blends XIII and XIV (as well as Blend XII) offer the further advantage of being composed of low odor components.

EXAMPLES 85-90

These examples illustrate the catalytic effectiveness for rigid foam formation of catalyst systems of the invention comprising DMEE in combination with BDMEE-R as a binary system or in further combination with an organic compound of tin. As described in greater detail under Examples 17-20 herinabove, BDMEE-R is a distilled residue product derived from the manufacture of bis[2-(N,N-dimethylamino)ethyl]ether. The particular catalyst systems employed in these examples had the respective compositions given in the following Table XXVI.

TABLE XXVI

| | Component | Weight % |
|---|---|---|
| Blend XV: | DMEE[1] | 75 |
| | BDMEE-R[2] | 25 |
| Blend XVI: | DMEE | 72 |
| | BDMEE-R | 25 |
| | Dibutyltin dilaurate | 3 |

[1]2-(2-Dimethylaminoethoxy)ethanol.
[2]As described under Examples 17-20.

Rigid foams were prepared following Foaming Procedure II employing Blends XV and XVI as the catalyst components of fluorocarbon-blown Foam Formulation F, and Blend XVI as the catalyst component of fluorocarbon/water-blown Foam Formulation E. The results are given in the following Table XXVII which, for convenience, repeates comparative Runs C-51 (from Table XXVI and C-55 (from Table XXV).

TABLE XXVII
BLENDED CATALYSTS COMPRISING DMEE FOR RIGID FOAM BLOWN WITH FLUOROCARBON ± WATER

| Example No. | — | 85 | 86 | 87 | 88 | — | 89 | 90 |
|---|---|---|---|---|---|---|---|---|
| Run No. | C-51 | — | — | — | — | C-55 | — | — |
| Foam No. | 116 | 131 | 132 | 133 | 134 | 126 | 135 | 136 |
| Foam Formulation | — | — | F[1] | — | — | — | E[2] | — |
| Catalyst system: | | | | | | | | |
| DMCHA[3], p.p.h.p. | 1.5 | — | — | — | — | 2.0 | — | — |
| Blend XV[4], p.p.h.p. | — | 1.25 | 1.50 | — | — | — | — | — |
| Blend XVI[4], p.p.h.p. | — | — | — | 1.25 | 1.50 | — | 1.0 | 2.0 |
| Cream time, seconds | 16.5 | 19 | 17 | 22 | 19 | 10 | 10 | 7 |
| Gel time, seconds | 119 | 155 | 147 | 134 | 120 | 66 | 80 | 53 |
| Tack-free time, seconds | 121 | 170 | 160 | 140 | 125 | 68 | 90 | 68 |
| Rise time, seconds | 222 | 273 | 204 | 250 | 218 | 149 | 152 | 116 |
| Density, lbs./cu.ft. | — | — | — | 1.45 | 1.42 | — | 1.25 | 1.20 |
| Closed cells, percent | — | — | — | 84.9 | 83.4 | 87.2 | 79.3 | 78.6 |
| Cold age shrinkage, % | — | — | — | — | — | 69 | 62.2 | 64.8 |

[1]The other components are as defined in Table XVI.
[2]The other components are as defined in Table XIV.
[3]N,N-dimethylcyclohexylamine.
[4]As defined in Table XXVI.

The results of Table XXVII indicate thay Blends Xv and XVI of the invention are also effective catalyst components of rigid foam formulations. The data further show that ternary Blend XVI which was tested in both the fluorocarbon and water/fluorocarbon blown formulations, also exhibited excellent performance latitude relative to N.N-dimethylcyclohexylamine (DMCHA). Thus, the reactivity of Blend XVI in the fluorocarbon system was about the same as that of DMCHA as shown by comparing the results of Example 88 and Run C-51, and, in the fluorocarbon/water system, Blend XVI was a faster (but not too highly active) catalyst than DMCHA as shown by comparing the results of Example 90 and Run C-55.

EXAMPLES 91 and 92

In these examples, the reactivity of catalysts of the invention was evaluated in a rigid foam formulation containing a higher concentration of water and a lower level of fluorocarbon than in Foam Formulation E of Table XIV. This particular reaction mixture is referred to herein as Foam Formulation G and has the composition given in the following Table XXVIII.

TABLE XXVIII

| FOAM FORMULATION G | |
|---|---|
| Component | Parts By Weight |
| Polyol B /1/ | 100 |
| Polyisocyanate B /1/ | 110.9 |
| Blowing Agent: | |
| Water | 2.4 |
| Trichlorofluoromethane | 36.0 |
| Catalyst system | /2/ |

/1/ As defined in Table XIV.
/2/ As given in Table XXIX.

In Example 91, the catalyst system was Blend XIV which, as defined in Table XXIII, contains 72 weight percent of 2-(2-dimethylaminoethoxy)ethanol (DMEE), 25 weight percent of 3-dimethylamino-N,N-dimethylpropionamide (DDPA) and 3 weight percent of dibutyltin dilaurate. In Example 92, a further ternary catalyst system of the invention, designated herein as Blend XVII, was employed. The latter blend contains: (1) 72 weight percent of DMEEE-R-1 which is distilled residue comprising a major proportion of 2-[2-(2-dimethylaminoethoxy)ethoxy]ethanol (DNEEE) and is as described in greater detail under Examples 56–58; (2) 25 weight percent of DDPA; and (3) 3 weight percent of dibutyltin dilaurate. Each of Blends XIV and XVII was employed as the catalyst system of Foam Formulation G at a concentration of 2.5 p.p.h.p. Comparative reactivity data were also obtained (Run C-56) employing, as the catalyst system of Foam Formulation G, 1.2 p.p.h.p. of the standard 33 weight percent solution of triethylenediamine in dipropylene glycol and 2.4 p.p.h.p. of dimethylethanolamine (DMEA). The said catalyst system used in Run C-56 is also employed in commercial practice for rigid foam manufacture. Each foam preparation followed the same procedure which was substantially as described under Foaming Procedure II. The results are given in the following Table XXIX.

TABLE XXIX

| Example No. | — | 91 | 92 |
|---|---|---|---|
| Run No. | C-56 | — | — |
| Foam No. | 137 | 138 | 139 |
| Foam Formulation G[1] | | | |
| Catalyst system: | | | |
| TEDA[2], p.p.h.p. | 1.2 | — | — |
| DMEA[3], p.p.h.p. | 2.4 | — | — |
| Blend XIV[4], p.p.h.p. | — | 2.5 | — |
| Blend XVII[5], p.p.h.p. | — | — | 2.5 |
| Cream time, seconds | 7–8 | 7–8 | 10 |
| Gel time, seconds | 45 | 40 | 45 |
| Tack-free time, seconds | 55 | 55 | 55 |
| Rise time, seconds | 100 | 85 | 88 |

[1]The other components are as defined in Table XXVIII.
[2]Triethylenediamine employed as a 33 weight percent solution in dipropylene glycol.
[3]Dimethylethanolamine.
[4]DMEE (72), DDPA (25) and dibutyltin dilaurate (3), as defined in Table XXIII.
[5]DMEEE-R-1 (72), DDPA (25) and dibutyltin dilaurate (3).

The reactivity data of Table XXIX indicate that Blends XIV and XVII of the invention are faster catalysts for promoting rigid Foam Formulation G than the combination of triethylenediamine and dimethylethanolamine.

EXAMPLES 93 and 94

In accordance with these examples, Blend XIV of the invention was employed as the catalyst component of 3 parts water, flexible polyether Foam Formulation D of Table VIII. As defined in Table XXIII, Blend XIV is constituted of (weight percent): DMEE (72), 3-dimethylamino-N,N-dimethylpropionamide (25) and dibutyltin dilaurate (3). The foams of these examples were prepared following Foaming Procedure I-C. The results are given in the following Table XXX.

TABLE XXX

| Example No. | 93 | 94 |
|---|---|---|
| Foam No. | 140 | 141 |
| Foam Formulation D[1] | | |
| Catalyst: | | |
| Blend XIV[2], p.p.h.p. | 0.20 | 0.30 |
| Cream time, seconds | 11 | 11 |
| Rise time, seconds | 106 | 100 |
| Breathability, SCFM | 4.5 | 4.25 |
| Density, lbs./cu.ft. | 1.94 | 1.99 |

[1]The other components are as defined in Table VIII.
[2]As defined in Table XXIII.

As previously demonstrated herein such as, for example, by the data of Tables XXIV and XXV, Blend XIV of the invention exhibits excellent performance latitude in its ability to catalyze water/fluorocarbon-blown rigid formulations as well as those which are blown with fluorocarbon only, at acceptable processing times. The versatility of such catalyst systems of the present invention is further indicated by the data of above Table XXX, which shows that Blend XIV is also a suitable catalyst for forming all water-blown flexible polyether urethane foam of good breathability and density.

EXAMPLES 95–99

The purpose of these examples is to demonstrate the efficacy of illustrative catalyst systems of the present invention in forming molded rigid foam under simulated flow characteristics encountered in actual manufacture of refrigeration foam. For this purpose, a standard test, known as the "L-panel" test, was followed. In this test, the foam formulation is placed in a heated mold after mixing and is allowed to rise. The mold is comprised of a lower section (10 × 16.7 × 1 inch) and an upper section (24 × 10 × 1 inch) positioned at a right angle to the first; hence the term "L-panel." The foam formulation is poured into the lower mold section and is allowed to rise up into the upper part. In so doing, the foaming mass must accomplish a right angle turn and enter the back panel. Critical to the production of good foam is the balance of reactivity to allow the mass to enter the upper part of the mold before complete gelation. Gelation too soon creates stress lines at the angular construction and results in separation and other structural deficiencies. Once the foam has entered the back cavity the height of the foam rise therein is a measure of the final activity. If maximum rise is reached too early, high overall density will be obtained and more charge will be required to fill any given cavity. Another measure of reaction balance is the angular deformation on cold aging. In this test, a curd L-panel foam (allowed to cure overnight at room temperature) is cut so as to provide an L-shaped section about 6 inches wide with each leg about 6 inches long. These samples are placed in a freezer at minus 30° C. and allowed to remain overnight. After this time, the angular deformation is measured. The smaller angular deformation indicates a better cold age stability.

The particular catalyst systems employed in forming the L-panels of these examples contained DMEE and N,N,N',N'-tetramethylethylenediamine ("TMEDA") as a binary catalyst system (Blend XVIII) or as the amine components of a ternary catalyst system containing dibutyltin dilaurate (Blend XIX and above-described Blend XI). The respective compositions of these catalyst systems is given in the following Table XXXI which, for convenience, also includes the composition of Blend XI.

TABLE XXXI

| | Component | Weight % |
|---|---|---|
| Blend XVIII: | DMEE[1] | 65 |
| | TMEDA[2] | 35 |
| Blend XIX: | DMEE | 69 |
| | TMEDA | 30 |
| | DBTDL[3] | 1 |
| Blend XI: | DMEE | 72 |
| | TMEDA | 25 |
| | DBTDL | 3 |

[1]2-(2-Dimethylaminoethoxy)ethanol.
[2]N,N,N',N'-Tetramethylethylenediamine.
[3]Dibutyltin dilaurate.

In Examples 95 and 96, Blends XVIII and XIX were employed as the respective catalyst systems of Foam Formulation E (Table XIV) at a concentration of 1.5 p.p.h.p. and, in Examples 97–99, Blend XI was employed as the catalyst system of the same formulation at 1.00, 1.5 and 2.0 p.p.h.p. Thus, in Example 95, the formulation contained no dibutyltin dilaurate. In Example 96, Blend XIX provided the foam system with 0.015 p.p.h.p. of tin compound and, in Examples 97–99, Blend XI provided a tin concentration of 0.03, 0.045 and 0.06 p.p.h.p. As standards for he performance of the catalyst systems of the invention, L-panels were also prepared employing a 33 weight percent solution of triethylenediamine (Run Nos. C-57 to C-59) and N,N-dimethylcyclohexylamine (Run Nos. C-60 to C-62), as the respective catalysts of Foam Formulation E at 1.0, 1.5 and 2.0 p.p.h.p. In each foam preparation, the abovedescribed L-panel mold was used and the same manipulative steps were followed. Thus, in the examples C runs, the L-panel mold was waxed lightly with mold release agent and placed in an oven at about 150° C. When the mold temperature was about 150° C., it was removed and allowed to cool to about 120° C. The foam components were mixed following the mixing procedure described under Foaming Procedure II. The mix was then poured into the L-panel mold at a mold temperature of 120° C. Clamps were placed and the mold kept at ambient temperature until foam rise was complete (less than 5 minutes). The mold was then placed in the oven for about 5 minutes, then removed and allowed to cool. Foams were demolded after a 10 minute cooling period. Foam characteristics such as cream, gel, tack-free and rise times were determined on the foam residue remaining in the cup in which the components were mixed. These measurements are given in Table XXXII which also includes the height of rise (in millimeters) and the overall density of the molded L-panel shaped foams as well as their angular deformation on cold aging at minus 30° C. Flowability in all of the molded samples was good and no separations or pockets were observed. Table XXXII follows.

TABLE XXXII

BLENDED CATALYSTS COMPRISING DMEE FOR MOLDED RIGID FOAM BLOWN WITH FLUOROCARBON + WATER

| Example No. | — | — | — | — | — | — | 95 | 96 | 97 | 98 | 99 |
|---|---|---|---|---|---|---|---|---|---|---|---|
| Run No. C- | 57 | 58 | 59 | 60 | 61 | 62 | — | — | — | — | — |
| Foam No. | 142 | 143 | 144 | 145 | 146 | 147 | 148 | 149 | 150 | 151 | 152 |
| Foam Formulation E[1] | | | | | | | | | | | |
| Catalyst system: | | | | | | | | | | | |
| TEDA[2], p.p.h.p. | 1.0 | 1.5 | 2.0 | — | — | — | — | — | — | — | — |
| DMCHA[3], p.p.h.p. | — | — | — | 1.0 | 1.5 | 2.0 | — | — | — | — | — |
| Blend XVIII[4], p.p.h.p. | — | — | — | — | — | — | 1.5 | — | — | — | — |
| Blend XIX[4], p.p.h.p. | — | — | — | — | — | — | — | 1.5 | — | — | — |
| Blend XI[4], p.p.h.p. | — | — | — | — | — | — | — | — | 1.0 | 1.5 | 2.0 |
| Cream time, seconds | 15 | 13 | 10 | 15 | 13 | 8 | 10 | 10 | 12 | 8 | 7 |
| Gel timme, seconds | 136 | 86 | 66 | 105 | 85 | 60 | 95 | 82 | 92 | 73 | 56 |
| Tack-free time, seconds | 140 | 90 | 70 | 123 | 96 | 66 | 98 | 103 | 112 | 82 | 64 |
| Rise time, seconds | 188 | 170 | 130 | 191 | 158 | 146 | 160 | 148 | 176 | 150 | 135 |
| Height of rise, mm. | 45.1 | 46.2 | 43.6 | 46.0 | 46.0 | 46.6 | 49.0 | 51.3 | 45.4 | 47.1 | 46.1 |
| Overall density, lbs./cu.ft. | 1.67 | 1.66 | 1.73 | 1.66 | 1.65 | 1.66 | 1.58 | 1.57 | 1.66 | 1.63 | 1.63 |
| Angular deformation on cold aging | 15 | 26 | 44 | 11 | 31 | 30 | 14 | 29 | 19 | 34 | 30 |

[1]The other components are as defined in Table XIV.
[2]Triethylenediamine employed as a 33 weight percent solution in dipropylene glycol.
[3]N,N-dimethylcyclohexylamine.
[4]As defined in Table XXXI.

The data of Table XXXII indicate the good performance of the catalyst systems of the invention in providing molded refrigeration foam. It is noted that in Example 96, the use of ternary Blend XIX at 1.5 p.p.h.p. provided 0.015 p.p.h.p. of dibutyltin dilaurate to the formulation. Relative to binary Blend XVIII (no tin compound) employed in Example 95, also at 1.5 p.p.h.p., Blend XIX provided molded foam of substantially increased angular deformation on cold aging (14 in Example 95 versus 29 in Example 96). However, relative to N,N-dimethylcyclohexylamine (DMCHA) which is employed commercially for the manufacture of refrigeration foam, Blend XIX provided molded foam having about the same cold aging stability, that is, angular deformation of 29 in Example 96 versus 31 in Run C-61. Further, although in the series of foam preparations of Examples 97, 98 and 99, the use of ternary Blend XI (3 weight percent of tin compound) provided higher concentrations of tin compound (0.03, 0.045 and 0.060 p.p.h.p.) to the respective foam systems than in Example 96, cold age stability also remained at acceptable levels relative to the commercially employed DMCHA. Thus, in Examples 97, 98 and 99 and Runs C-60, -61 and -62 in which the respective catalysts were used at 1.0, 1.5 and 2.0 p.p.h.p. (the gel time advancing with increasing catalyst concentration), the angular deformations of the foams obtained with Blend XI were 19, 34 and 30, the values obtained with DMCHA being 11, 31 and 30. It is evident that the catalyst systems of the present invention exhibit good performance for molded refrigeration foam relative to the more highly odorous catalyst, DMCHA, employed in commercial practice.

EXAMPLES 100-102

In these examples, an evaluation was made in accordance with the L-panel test described under Examples 95-99, of other illustrative catalyst systems of the invention as components of an all fluorocarbon-blown rigid foam system containing a flame-retardant. The particular system employed, Foam Formulation H, had the composition given in the following Table XXXIII.

TABLE XXXIII

FOAM FORMULATION H

| Component | Parts By Weight |
|---|---|
| Polyol B /1/ | 70.0 |
| Flame-retardant diol /2/ | 30.0 |
| Polyisocyanate C: A polyphenylmethylene polyisocyanate having an average -NCO functionality of 2.7 and a free -NCO content of 30.5-32.3 weight percent. | 101.4 |
| Blowing agent: | |
| Water | 0.0 |
| Trichlorofluoromethane | 50.0 |
| Surfactant C /3/ | 0.2 |
| Catalyst system | Varied |

/1/ As defined in Table XIV.
/2/ O,O-diethyl-N,N-bis(2-hydroxyethyl)amino-methyl phosphonate.
/4/ Silicone Surfactant Y-6760 (Union Carbide Corporation).

In Examples 100 and 101, the respective catalyst systems were above-described Blends XIII and XIV. In Example 102, the catalyst system contained DMEE, N,N,N',N'-tetramethyl1,3-butanediamine and dibutyltin dilaurate. The composition of Blend XX is given in the following Table XXXIV which, for convenience, also includes the composition of Blends XIII and XIV.

TABLE XXXIV

| | Component | Weight % |
|---|---|---|
| Blend XIII: | DMEE[1] | 74 |
| | DDPA[2] | 25 |
| | DBTDL[3] | 1 |
| Blend XIV: | DMEE | 72 |
| | DDPA | 25 |
| | DBTDL | 3 |
| Blend XX: | DMEE | 73 |
| | TMBDA[4] | 25 |
| | DBTDL | 2 |

[1] 2-(2-Dimethylaminoethoxy)ethanol.
[2] 3-Dimethylamino-N,N-dimethylpropionamide.
[3] Dibutyltin dilaurate.
[4] N,N,N',N'-tetramethyl-1,3-butanediamine.

In each of Examples 100-102, the above-identified blends were used at 0.75 p.p.h.p. Comparative data were also obtained in the L-panel test based on the use of N,N-dimethylcyclohexylamine (DMCHA) at 1.5 p.p.h.p. (Run C-63) and N,N,N',N'-tetramethyl-1,3-butanediamine (TMBDA) at 0.75 p.p.h.p. (Run C-64), as the respective catalyst components of Foam Formulation H. The L-panels of the examples and Runs C-63 and C-64 were prepared in accordance with the procedure described under above Examples 95-99. The results are given in Table XXXV which follows.

TABLE XXXV

DMEE-CONTAINING CATALYST SYSTEMS FOR ALL FLUOROCARBON-BLOWN MOLDED RIGID FOAM CONTAINING A FLAME-RETARDANT

| Example No. | — | — | 100 | 101 | 102 |
|---|---|---|---|---|---|
| Run No. C- | 63 | 64 | — | — | — |
| Foam No. | 153 | 154 | 155 | 156 | 157 |
| Foam Formulation H /1/ | | | | | |
| Catalyst system: | | | | | |
| DMCHA /2/, p.p.h.p. | 1.25 | — | — | — | — |
| TMBDA /3/, p.p.h.p. | — | 0.75 | — | — | — |
| Blend XIII /4/, p.p.h.p. | — | — | 0.75 | — | — |
| Blend XIV /4/, p.p.h.p. | — | — | — | 0.75 | — |
| Blend XX /4/, p.p.h.p. | — | — | — | — | 0.75 |
| Cream time, seconds | 18 | 25 | 23 | 23 | 22 |
| Gel time, seconds | 87 | 107 | 107 | 107 | 105 |
| Tack-free time, seconds | 150 | 170 | 180 | 150 | 168 |
| Rise time, seconds | 189 | 215 | 221 | 200 | 210 |
| Foam left in cup, grams | 20.1 | 20.3 | 19.5 | 19.0 | 18.0 |
| Weight of panel (trimmed), gms. | 330.3 | 331.4 | 331.3 | 334.5 | 335.7 |
| Adjusted height of rise, inches | 22.1 | 19.6 | 21.7 | 21.4 | 21.5 |
| Cells per inch | 35–40 | 35–40 | 35–40 | 35–40 | 35–40 |
| Shear planes /5/ | M | M-S | M | M | M |
| Shrinkage angles, degrees /6/ | 22.3 | 21.0 | 21.0 | 12.0 | 21.0 |
| Density, lbs./cu.ft. | 2.46 | 2.69 | 2.49 | 2.54 | 2.54 |
| Flow index | 0.099 | 0.092 | 0.098 | 0.096 | 0.098 |

/1/ The other components are as defined in Table XXXIII.
/2/ N,N-dimethylcyclohexylamine.
/3/ N,N,N',N'-tetramethyl-1,3-butanediamine.
/4/ As defined in Table XXXIV.
/5/ Shear planes are rated light (L), moderate (M) and severe (S); M-S denotes moderate to severe.
/6/ Average of three measurements.

The results of Table XXXV further demonstrate the excellent performance latitude of catalyst systems of the invention comprising DMEE, a second tertiary-amine component and a tin compound, in their ability to provide all fluorocarbon-blown molded rigid foam of good quality and cold age stability. It is also evident that the catalyst systems of the invention allow for either the replacement or reduction in concentration of amines such as N,N-dimethyl-cyclohexylamine (DMCHA) and N,N,N',N'-tetramethyl-1,3-butanediamine (TMBDA) which, although relatively potent catalysts for rigid foam formulations, are relatively high is volatility and objectionable odor. Thus, Blend XX employed in Example 102 at 0.75 p.p.h.p. contained only 25 weight percent of TMBDA, corresponding to the introduction of only about 0.19 p.p.h.p. of TMBDA to the formulation, whereas in Run C-64, the formulation contained 0.75 p.p.h.p. of TMBDA. Blends XIII and XIV are especially attractive catalyst systems in that they are based in low odor components, the results obtained therewith (Examples 100 and 101) indicating their suitability as replacements for DMCHA. A further advantage of the blended catalyst systems of the invention for rigid foam formation is that they allow for the facile, controlled addition of very low concentrations of tin compound to rigid foam formulations to obtain a proper balance of catalyst reactivities required to achieve refrigeration foam of satisfactory cold aging properties and overall density.

EXAMPLES 103-104

The purpose of these examples was to determine the efficacy of DMEE in providing molded semi-flexible foam which is free of voids. For this purpose, DMEE was employed as the sole catalyst of a semi-flexible foam system, designated Foam Formulation I, the organic polyol component of which was comprised of a polymer/polyether polyol. The composition of this formulation is given in Table XXXVI which follows.

TABLE XXXVI

FOAM FORMULATION I

| Component | Parts By Weight |
|---|---|
| Polyol C: An ethylene oxide-capped, glycerol started poly-(oxypropylene) triol having a Hydroxyl No. of about 34, a molecular weight of about 5000, and a primary hydroxyl content of 70-75 mole percent. | 5 |
| Polyol D: A polymer/polyether polyol having a Hydroxyl No. of about 28 and based on (parts by weight): styrene (10), acrylonitrile (10) and Polyol C (80), produced by polymerizing said monomers in Polyol C. | 95 |
| Polyisocyanate D: A polyphenylmethylene polyisocyanate having an average -NCO functionality of 2.6 and a free -NCO content of 31.2 weight percent. | Index 100 |
| Water | 1.5 |
| Surfactant D /1/ | 1.5 |
| Filler | 0 |
| Amine catalyst | Varied |

/1/ A polysiloxane oil having the average composition, Me₃SiO(Me₂SiO)₄[-MeO(C₂H₄O)₃C₂H₄SiMeo]₂.₅SiMe₃ where Me is methyl, employed as a 10 weight percent solution in Polyol C.

In addition to DMEE, other catalysts evaluated as the respective catalyst components of Foam Formulation I were triethylenediamine as a 33 weight percent active solution and dimethylethanolamine. The same procedure was applied to each foam preparation and entailed the following manipulative steps.

Foam Procedure For Molded Semi-Flexible Foam

The polyol is weighed into a one quart cup and, except for the blowing agent and polyisocyanate, the other ingredients are added to the polyol while mixing at 1000 revolutions per minute. After the last ingredient is added, mixing is continued for 5 minutes, also at 1000 r.p.m. The polyol master is conditioned to 80° F.±2°. Blowing agent is added followed by the addition of the polyisocyanate reactant which is also preconditioned to 80° F.±2°. Mixing is then started immediately at 2500 to 3000 r.p.m. and is continued for 10 second with vigorous circular motions of the cup. The system is then poured immediately into a standard baffled test mold. Systems which perform well in this test, flow enough to fill the mold and cure in a manner which produces a foam pad free from voids. In addition, acceptable systems should not yield molded parts which show excessive shrinkage after demolding or which cream so fast as to be impractical.

Following the above procedure, in addition to DMEE (at a concentration from 0.75 to 2.0 p.p.h.p.), dimethylethanolamine (0.2 to 2.0 p.p.h.p.) and triethylenediamine (0.5 to 2.0 p.p.h.p. as a 33 weight percent solution) were also employed as the respective amine components of Foam Formulation I. In each series, the results obtained at the lower and upper concentrations of the indicated respective ranges were deficient and, except for DMEE, the results obtained with the other two catalysts at intermediate concentrations were also deficient. The results are summarized in Table XXXVII which follows.

TABLE XXXVII

MOLDED SEMI-FLEXIBLE POLYETHER FOAM (NO FILLER)

| Example No. | — | — | — | — | — | — | 103 | 104 |
|---|---|---|---|---|---|---|---|---|
| Run No. C- | 65 | 66 | 67 | 68 | 69 | 70 | — | — |
| Foam No. | 158 | 159 | 160 | 161 | 162 | 163 | 164 | 165 |
| Foam Formulation I /1/ | | | | | | | | |
| Amine catalyst: | | | | | | | | |
| TEDA /2/, p.p.h.p. | 0.5 | 1.5 | 1.75 | 2.0 | — | — | — | — |
| DMEA /3/, p.p.h.p. | — | — | — | — | 0.5 | 1.5 | — | — |
| DMEE /4/, p.p.h.p. /5/ | — | — | — | — | — | — | 1.25 | 1.50 |
| Foam Cured | No | Yes | Yes | Yes | No | Yes | Yes | Yes |
| Foam Shrinkage | No | No | No | No | No | Yes | No | No |
| Foam Voids | Yes | Yes | Yes | Yes | Yes | Yes | No | No |
| Type of voids | — | Large | — | /6/ | /7/ | /6/ | — | — |
| Processability | OK | OK | OK | /8/ | — | — | OK | OK |

/1/ The other components are as defined in Table XXXVI.
/2/ A 33 weight percent solution of triethylenediamine in dipropylene glycol.
/3/ Dimethylethanolamine.
/4/ 2-(2-Dimethylaminoethoxy)ethanol.
/5/ At 0.75 p.p.h.p., the foam was not cured; at 2.0 p.p.h.p., creaming was rapid and voids were observed.
/6/ Slight
/7/ Moderate.
/8/ Creams too fast; required cooling of mix prior to pouring into mold.

As indicated in Table XXXVII (footnote 5), at a concentration of 0.75 p.p.h.p., DMEE did not cure the system and, at 2.0 p.p.h.p., the system was creaming rapidly and voids were formed. However, at 1.25 and 1.5 p.p.h.p. (Examples 103 and 104, respectively), DMEE produced excellent cure and rise time. The surface of these pads was excellent with a good demoldable skin, and did not shrink upon demolding. As also summarized in Table XXXVII, DMEA provided voids and a slightly undercured foam at low concentration (Run C-69) and, although increasing the concentration provided a satisfactory cure and reduced voids considerably (Run C-70), the foam pad was not void free and slight shrinkage of the demolded foam occurred. As further recorded in Table XXXVII, the triethylenediamine solution employed in Runs C-65 to C-68, provided a foam pad at 0.5 p.p.h.p. which was undercured and showed large voids and, at 2.0 p.p.h.p., the system creamed so fast under the standard test conditions, that it required cooling to allow pouring into the mold. At 1.5 and 1.75 p.p.h.p. (Runs C-66 and -67), even though cure was improved, the molded foam pad still had large voids and, due to the high blowing efficiency of triethylenediamine, the surface of the pads was torn apart.

EXAMPLES 105-106

In accordance with these examples, DMEE was employed as the amine component of a semi-flexible foam system containing a relatively high content of calcium carbonate as a filler. The composition of the foam system, designated Foam Formulation J, is given in the following Table XXXVIII.

TABLE XXXVIII

FOAM FORMULATION J

| Component | Parts By Weight |
| --- | --- |
| Polyol C /1/ | 40 |
| Polyol D /1/ | 60 |
| Polyisocyanate D /1/ | Index 100 |
| Water | 1.5 |
| Surfactant D /1/ | 1.5 |
| Filler (calcium carbonate) | 20 |
| Amine catalyst | Varied |

/1/ Same as in Formulation I of Table XXXVI.

Foams were also prepared employing dimethylethanolamine (Runs C-71 and -72) as the amine component of Foam Formulation J. Each foam preparation followed the procedure described under Examples 103 and 104, employing the same baffled test mold. The catalyst concentration and results are given in Table XXXIX which follows.

TABLE XXXIX

MOLDED SEMI-FLEXIBLE
POLYETHER FOAM CONTAINING FILLER

| Example No. | — | — | 105 | 106 |
| --- | --- | --- | --- | --- |
| Run No. C- | 71 | 72 | — | — |
| Foam No. | 166 | 167 | 168 | 169 |
| Foam Formulation J /1/ | | | | |
| Amine catalyst: | | | | |
| DMEA /2/, p.p.h.p. | 0.5 | 1.5 | — | — |
| DMEE /3/, p.p.h.p. | — | — | 1.25 | 1.50 |
| Foam Cured | No | Yes | Yes | Yes |
| Foam Shrinkage | No | Yes | No | No |
| Foam Voids | Yes | Yes | No | No |
| Type of voids | /4/ | /5/ | — | — |
| Processability | — | — | OK | OK |

/1/ The other components are as defined in Table XXXVIII.
/2/ Dimethylethanolamine.
/3/ 2-(2-Dimethylaminoethoxy)ethanol.
/4/ Moderate.
/5/ Slight.

The results of Table XXXIX further demonstrate that, relative to dimethylethanolamine, DMEE exhibits unique properties in its ability to provide molded semi-flexible filled foam which is free of voids and does not shrink upon demolding.

EXAMPLES 107-110

These examples illustrate the utility of DMEE-containing catalyst systems of the invention as components of a high-resilience foam formulation comprising a polymer/polyether polyol. The composition of the high-resilience foam system employed is given in Table XL which follows.

TABLE XL

FOAM FORMULATION K

| Components | Parts By Weight |
| --- | --- |
| Polyol C /1/ | 60 |
| Polyol D /1/ | 40 |
| Polyisocyanate E: A mixture of: 80 weight percent of the 2,4- and 2,6- isomers of tolylene diisocyanate, the weight ratio of said isomers being 80:20, respectively; and (2) 20 weight percent of a polyphenylmethylene polyisocyanate having an average -NCO functionality of 2.7 and a free -NCO content of 30.5-32.3 weight percent. | Index 107 |
| Water | 2.6 |
| Dibutyltin dilaurate | 0.015 |
| Surfactant D /1/ | 1.65 |
| Amine Catalyst System: | |
| Amine Catalyst A: A 33 weight percent solution of 3-dimethylamino-N,N-dimethylpropionamide in TERGITOL TP-9. | 0.30 |
| Amine Catalyst B: A 33 weight percent solution of triethylenediamine in dipropylene glycol. | Varied |
| Amine Catalyst C: A 70 weight percent solution of bis[2-(N,N-dimethylamino)-ethyl]ether in dipropylene glycol. | Varied |
| Other Amine Catalysts: | |
| PMDETA /2/ | Varied |
| TMBDA /3/ | Varied |
| DMEE /4/ | Varied |

/1/ As defined in Table XXXVI.
/2/ 1,1,4,7,7-Pentamethyldiethylenetriamine.
/3/ N,N,N',N'-Tetramethyl-1,3-butanediamine.
/4/ 2-(2-Dimethylaminoethoxy)ethanol.

In Examples 107 and 108, DMEE was employed at 0.4 p.p.h.p. as the other amine catalyst component of Foam Formulation K. In Example 109, DMEE was added to the system preblended with 1,1,4,7,7-pentamethyldiethylenetriamine (PMDETA). In Example 110, DMEE was added preblended with N,N,N',N'-tetramethyl-1,3-butanediamine (TMBDA). The said blends were Blends VI and VII defined in Table XI hereinabove and, as indicated, each contained 45 weight percent of DMEE. In Examples 109 and 110, Blends VI and VII were added to the formulation in a concentration of 0.2 p.p.h.p., thereby providing 0.11 p.p.h.p. of PMDETA and TMBDA to the respective reaction mixtures and 0.09 p.p.h.p. of DMEE. For comparison, foams were also prepared with catalyst systems containing no DMEE (Runs C-73 to C-75); PMDETA and TMBDA were present in the formulations of Runs C-74 and C-75, respectively. The same procedure was applied in each foam preparation and entailed the following manipulative steps.

Foam Procedure For Molded High-Resilience Foam

An aluminum mold (4.5 × 15 × 15 inches) is prepared by first waxing lightly with Brulin Permamold Release Agent and then pre-heating in a 140° C. oven for about 10 minutes to raise the temperature of the mold to 175°-200° F. Excess mold-release agent is wiped off and the mold is allowed to cool to 120° F. before foaming. The initial mixing of the components of the foam formulation is started when the mold is cooled to about 130° F. All components of the reaction mixture, except the polyisocyanate reactant, are measured or weighed into a one-half gallon, five inch diameter, cylindrical, cardboard carton and mixed 60 seconds with a 2½ inch, 6-blade turbine at 4000 revolutions per minute. The polyisocyanate reactant is then weighed into the mixture of other components; stainless-steel baffles designed for the ½-gallon carton are inserted, and mixing is continued for 5 seconds. The carton is then lowered to allow the mixer to drain, and the contents are quickly poured into the mold. The mold lid is closed and clamps are placed around the mold to permit flashout. "Exit time" is observed and defined as the time when all four top holes of the mold are full, that is, when the foam begins to exude from all four holes of the mold. The mold is demolded after standing at room temperature for 10 minutes. After trimming around the edges with scissors, the foam sample is weighed. The foam is then allowed to cure for at least one day at room temperature before being submitted for porosity measurements. In those instances where, at the time of demolding, the surface of the foam was slightly tacky (Run C-74 and Example 107) or tacky (Examples 108–110), the surface became fully cured and tack-free within about an hour. The results including the porosity measurements are given in Table XLI which follows.

flexible polyester foam formulation designed to provide free-rise, diecutable foam. Both foams were prepared in accordance with the same procedure which entailed the following manipulative steps: The surfactant, amine catalysts and water are premixed in a 50 milliliter beaker. The polyester polyol reactant is weighed into a tared 32-ounce capacity container. The tolylene diisocyanate reactant is also weighed into the container and mixed with a spatula until homogeneous. Further mixing is done on a drill press equipped with a double three-bladed marine-type propeller about three inches in diameter. The mixing in the drill press is accomplished at 1000 revolutions per minute for eight seconds. Then the activator solution of surfactant, catalyst and water is added and mixing is continued for seven additional seconds. The reaction mixture is poured into a 12 in. × 12 in. × 12 in. cardboard box, is allowed to rise and is

TABLE XLI

DMEE-CONTAINING CATALYSTS FOR MOLDED HIGH-RESILIENCE FOAM

| Example No. | — | — | — | 107 | 108 | 109 | 110 |
|---|---|---|---|---|---|---|---|
| Run No. C- | 73 | 74 | 75 | — | — | — | — |
| Foam No. | 170 | 171 | 172 | 173 | 174 | 175 | 176 |
| Foam Formulation K /1/ | | | | | | | |
| Amine catalyst system: | | | | | | | |
| Amine Catalyst A /1/, p.p.h.p. | 0.3 | 0.3 | 0.3 | 0.3 | 0.3 | 0.3 | 0.3 |
| Amine Catalyst B /1/, p.p.h.p. | 0.36 | 0.36 | 0.36 | 0.36 | — | 0.36 | 0.36 |
| Amine Catalyst C /1/, p.p.h.p. | 0.1 | — | — | — | 0.1 | — | — |
| PMDETA /2/, p.p.h.p. | — | 0.15 | — | — | — | 0.11 | — |
| TMBDA /3/, p.p.h.p. | — | — | 0.15 | — | — | — | 0.11 |
| DMEE /4/, p.p.h.p. | — | — | — | 0.4 | 0.4 | 0.09 | 0.09 |
| Cream time, seconds | 5 | 5 | 5 | 5 | 5 | 5 | 5 |
| Exit time, seconds | 97 | 79 | 96 | 93 | 103 | 100 | 113 |
| Weight of foam pad, grams | 664 | 651 | 670 | 670 | 670 | 660 | 670 |
| Porosity, SCFM | 0.74 | 1.6 | 0.8 | 1.1 | 1.15 | 2.6 | 2.3 |

/1/ As defined in Table XL.
/2/ 1,1,4,7,7-Pentamethyldiethylenetriamine.
/3/ N,N,N',N'-Tetramethyl-1,3-butanediamine.
/4/ 2-(2-Dimethylaminoethoxy)ethanol.

The results of Table XLI indicate that Foams 173 to 176 of Examples 107 to 110, in which DMEE was present, were of higher porosity (1.1, 1.5, 2.6 and 2.3) than the porosity of Foam 170 of Run C-73 (0.74). Further, although Foam 171 of Run C-74 in which PMDETA (0.15 p.p.h.p.) but no DMEE was present, provided a foam of enhanced porosity (1.6) relative to Foam 170 (0.74), the presence of DMEE (0.09 p.p.h.p.) in combination with PMDETA (0.11 p.p.h.p.) as in Example 109, provided a foam porosity of 2.6. Enhancement in porosity was also observed when DMEE was used in combination with TMBDA. Thus, in Example 110, 0.09 p.p.h.p. pf DMEE and 0.11 p.p.h.p. pf TMBDA provided a foam porosity of 2.3 whereas in Run C-75 in which TMBDA was present at 0.15 p.p.h.p., foam porosity was only 0.8.

It is evident from the data presented herein that the catalyst systems of the invention have excellent performance latitude in providing cellular urethane products derived from organic polyol reactants comprising a polyether polyol, such products ranging from all water-blown flexible polyether foam to all fluorocarbon-blown rigid foam (both free-rise and molded) including semi-flexible and high-resilience foam. As demonstrated and discussed with particular reference to Examples 1 to 12, DMEE as well as DMEEE exhibit unexpected catalytic reactivity relative to DMEA in water-blown flexible polyether foam systems. A corresponding enhancement in catalytic activity relative to DMEA was not observed, however, when DMEE was used as a replacement for DMEA in an all water-blown flexible polyester foam formulation. Table XLII presents data (Runs C-76 and C-77) based on the use of DMEA and DMEE as respective components of a water-blown then cured for about 30 minutes at 130° C. The components of the foam formulation and the results are given in Table XLII which follows.

TABLE XLII

| Run No. | C-76 | C-77 |
|---|---|---|
| Formulation, parts by weight | | |
| Polyester polyol /1/ | 100 | 100 |
| Polyisocyanate A /2/ | 47.2 | 47.2 |
| N-Cocomorpholine | 1.4 | 1.4 |
| Hexadecyldimethylamine | 0.25 | 0.25 |
| DMEA | 0.4 | — |
| DMEE | — | 0.4 |
| Water | 3.3 | 3.3 |
| Silicone surfactant /3/ | 1.0 | 1.0 |
| Activator solubility | Clear | Cloudy |
| Cream time, seconds | 13 | 14 |
| Rise time, seconds | 78 | 76 |
| Height of rise, inches | 5.7 | 5.8 |
| Breathability, SCFM | 0.9 | 1.15 |
| Density, lbs./cu.ft. | 1.86 | 1.78 |
| Elongation, % | 262 | 377 |
| Diecutability /4/ | | |
| Recovery, % | | |
| After 5-10 seconds | 100 | — |
| After 15 seconds | — | 70 |
| After 30 seconds | — | 90 |
| After 60 seconds | — | 95+ |

/1/ A polyester polyol having a Hydroxyl No. of 49-55, a typical viscosity at 25° C. (Brookfield LVF) of 19,000-23,000 centipoise and an acid number not greater than 2.0 ("Wilmar Polyester 180" of the Wilson-Martin Division of Wilson Pharmaceutical & Chemical Corporation).
/2/ As defined in Table I.
/3/ Silicone Surfactant Y-6769 (Union Carbide Corporation).
/4/ Sample thickness was 0.5 inch.

The results of Table XLII indicate that, in contrast to the marked improvement in catalytic activity of DMEE relative to dimethylethanolamine (DMEA) in providing water-blown flexible polyether urethane foam, DMEE and DMEA showed about the same activity on a parts by weight basis in the water-blown flexible polyester foam system.

What is claimed is:

1. A method for producing a cellular urethane polymer which comprises reacting and foaming a reaction mixture containing: (1) an organic polyol reactant comprising a polyether polyol having an average hydroxyl functionality of at least two; (2) an organic polyisocyanate reactant having an average isocyanato functionality of at least two; (3) a blowing agent; and (4) a catalytically effective amount of a catalyst system comprising from about 10 to about 95 weight percent of component (i) and from about 90 to about 5 weight percent of component (ii), said percentages being based on the combined total weight of components (i) and (ii) contained in the reaction mixture, where component (i) is at least one dimethylamino ether mono-ol and component (ii) is at least one other tertiary-amine different from component (i), said dimethylamino ether mono-ol having the formula,

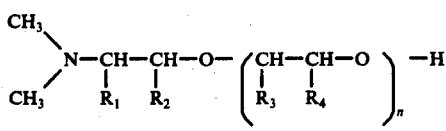

wherein:

$R_1$ and $R_2$ each represents hydrogen, methyl or ethyl provided $R_1$ and $R_2$ cumulatively have no more than two carbon atoms;

$R_3$ and $R_4$ each represents hydrogen, methyl or ethyl provided $R_3$ and $R_4$ cumulatively have no more than two carbon atoms; and $n$ has an average value of at least one and no more than about five.

2. A method as defined in claim 1 in which the value of $n$ of said dimethylamino ether mono-ol is no more than about three.

3. A method as defined in claim 1 in which $R_1$ and $R_2$ taken together have no more than one carbon atom, and $R_3$ and $R_4$ taken together have no more than one carbon atom.

4. A method as defined in claim 1 in which each of $R_1$ through $R_4$ of said dimethylamino ether mono-ol is hydrogen and the value of $n$ is no more than about three.

5. A method as defined in claim 1 in which said dimethylamino ether mono-ol is 2-(2-dimethylaminoethoxy)-ethanol.

6. A method as defined in claim 1 in which said dimethylamino ether mono-ol is 2-[2-(2-dimethylaminoethoxy)ethoxy]ethanol.

7. A method as defined in claim 1 in which the dimethylamino ether mono-ol component of the catalyst system is a distillable by-product which contains 2-[2-(2-dimethylaminoethoxy)ethoxy]ethanol and is formed in the preparation of 2-(2-dimethylaminoethoxy)ethanol by the oxyethylation of N,N-dimethylethanolamine.

8. A method as defined in claim 1 in which said other tertiary-amine component of the catalyst system is a bis[2-(N,N-dimethylamino)alkyl]ether.

9. A method as defined in claim 8 in which said bisether is bis[2-(N,N-dimethylamino)ethyl]ether.

10. A method as defined in claim 1 in which said other tertiary-amine component is a distillable by-product formed in the preparation of bis[2-(N,N-dimethylamino)ethyl]ether by the reaction of trimethylamine and 2-(2-dimethylaminoethoxy)ethanol in the presence of a nickel catalyst at a temperature from about 50° C. to about 300° C. employing from one to about 10 moles of trimethylamine per mole of 2-(2-dimethylaminoethoxy)-ethanol.

11. A method as defined in claim 1 in which said other tertiary-amine component of the catalyst system is a hydrocarbyl polyamine.

12. A method as defined in claim 1 in which said other tertiary-amine component is 3-dimethylamino-N,N-dimethylpropionamide.

13. A method as defined in claim 1 in which said other tertiary-amine component is N,N-dimethylethanolamine.

14. A method as defined in claim 1 in which said other tertiary-amine component is N,N-dimethylcyclohexylamine.

15. A method as defined in claim 1 in which said catalyst system additionally contains an organic compound of tin.

16. A method as defined in claim 15 in which said organic compound of tin is a stannous salt of a carboxylic acid.

17. A method as defined in claim 15 in which said organic compound of tin is a dialkyltin dicarboxylate.

18. A method for producing cellular polyurethanes which comprises reacting and forming a reaction mixture containing: (1) an organic polyol reactant comprising a polyether polyol having an average hydroxyl functionality from about two to about eight; (2) an organic polyisocyanate; (3) a blowing agent; and (4) from about 0.05 to about 10 parts by weight per one hundred parts by weight of total organic polyol reactant contained in the reaction mixture, of a catalyst system containing from about 10 to about 90 weight percent of component (i) which is a dimethylamino ether mono-ol having the formula, $(CH_3)_2N\text{—}CH_2CH_2\text{—}O\text{—}(CH_2CH_2O)_n\text{—}H$, where $n$ has an average value from one to about five, and from about 90 to about 10 weight percent of component (ii) which is at least one other tertiary-amine different from component (i), said weight percentages being based on the combined total weight of components (i) and (ii) contained in the reaction mixture.

19. A method as defined in claim 18 wherein said component (ii) of the catalyst system contains a distillable by-product formed in the preparation of bis[2-(N,N-dimethylamino)ethyl]ether by the reaction of trimethylamine and 2-(2-dimethylaminoethoxy)ethanol in the presence of a nickel catalyst at a temperature from about 140° C. to about 200° C. employing from two to about five moles of trimethylamine per mole of 2-(2-dimethylaminoethoxy)ethanol.

20. A method as defined in claim 19 in which the dimethylamino ether mono-ol component of the catalyst system is a distillable by-product which contains 2-[2-(2-dimethylaminoethoxy)ethoxy]ethanol and is formed in the preparation of 2-(2-dimethylaminoethoxy)ethanol by the oxyethylation of N,N-dimethylethanolamine.

21. A method as defined in claim 19 in which said dimethylamino ether mono-ol component of the catalyst system is 2-(2-dimethylaminoethoxy)ethanol.

22. A method as defined in claim 21 in which component (ii) of said catalyst system contains bis[2-(N,N-dimethylamino)ethyl]ether.

23. A method as defined in claim 21 in which component (ii) of said catalyst system contains N,N-dimethylethanolamine.

24. A method for producing a cellular urethane polymer which comprises reacting and foaming a reaction mixture containing (1) an organic polyisocyanate, (2) a polymer/polyether polyol produced by the in situ polymerization of at least one polymerizable ethylenically unsaturated monomer in a polyether polyol, (3) a blowing agent, and (4) from about 0.05 to about 10 parts by weight per one hundred parts by weight of total polyol contained in the reaction mixture, of a catalyst system comprising from about 10 to about 90 weight percent of component (i) which is at least one dimethylamino ether mono-ol having the formula, $(CH_3)_2N—CH_2CH_2—O—(CH_2CH_2O)_n—H$, where $n$ has an average value from one to about three, and from about 90 to about 10 weight percent of component (ii) which is at least one other tertiary-amine different from component (i), said weight percentages being based on the combined total weight of components (i) and (ii) contained in the reaction mixture.

25. A method as defined in claim 24 wherein said dimethylamino ether mono-ol is 2-(2-dimethylaminoethoxy)ethanol.

26. A method as defined in claim 24 in which said dimethylamino ether mono-ol is 2-[2-(2-dimethylaminoethoxy)ethoxy]ethanol.

27. A method as defined in claim 24 in which said reaction mixture additionally contains a polyether polyol reactant having an average functionality from 2.1 to about 5, a hydroxyl number from about 18 to about 40, and an average hydroxyl content which is constituted of between about 35 and about 85 mole percent of primary hydroxyl groups.

28. A method for producing flexible polyether urethane foam which comprises simultaneously reacting and foaming a polyether polyol having an average hydroxyl functionality from 2 to about 4 and a hydroxyl number from about 20 to about 125 in the presence of water as a source of blowing action, and from about 0.05 to about 4 parts by weight per one hundred parts by weight of polyether polyol contained in the reaction mixture, of a catalyst system comprising from about 10 to about 90 weight percent of component (i) and from about 90 to about 10 weight percent of component (ii), said weight percentages being based on the combined total weight of components (i) and (ii) contained in the reaction mixture, where component (i) is 2-(2-dimethylaminoethoxy)ethanol and component (ii) is bis[2-(N,N-dimethylamino)ethyl]ether.

29. A method as defined in claim 28 wherein said catalyst system additionally contains at least one of stannous octoate and dibutyltin dilaurate.

30. A method for producing rigid urethane foam which comprises reacting and foaming an organic polyisocyanate reactant and an organic polyol reactant comprising a polyether polyol having an average hydroxyl functionality from about 3 to about 8 and a hydroxyl number from about 200 to about 1000 in the presence of a blowing agent comprising fluorocarbon and from about 0.1 to about 10 parts by weight per one hundred parts by weight of total polyol contained in the reaction mixture, of a catalyst system comprising from about 10 to about 90 weight percent of component (i) and from about 90 to about 10 weight percent of component (ii), said weight percentages being based on the combined total weight of components (i) and (ii) contained in the reaction mixture, wherein component (i) is at least one tertiary-dimethylamino ether mono-ol selected from the group consisting of 2-(2-dimethylaminoethoxy)ethanol and 2-[2-(2-dimethylaminoethoxy)ethoxy]ethanol, and component (ii) is at least one other tertiary-amine different from component (i).

31. A method as defined in claim 30 in which said catalyst system additionally contains an organic compound of tin.

32. A method as defined in claim 31 in which said organic compound of tin is a stannous salt of a carboxylic acid.

33. A method as defined in claim 31 in which said organic compound of tin is a dialkyltin dicarboxylate.

34. A method as defined in claim 33 in which said dialkyltin dicarboxylate is dibutyltin dilaurate.

35. A method as defined in claim 31 in which said organic compound of tin is a dialkyltin oxide or a trialkyltin oxide.

36. A method as defined in claim 31 in which said organic compound of tin is a tin mercaptide.

37. A method as defined in claim 30 in which said other tertiary-amine encompassed by component (ii) is a hydrocarbyl polyamine.

38. A method as defined in claim 37 in which said hydrocarbyl polyamine is at least one member of the group consisting of triethylenediamine, N,N,N',N'-tetramethylethylenediamine, N,N,N',N'-tetraethylethylenediamine, N,N,N',N'-tetramethyl-1,3-butanediamine and 1,1,4,7,7-pentamethyldiethylenetriamine.

39. A method as defined in claim 30 in which said other tertiary-amine encompassed by component (ii) is N,N-dimethylcyclohexylamine.

40. A method as defined in claim 30 in which said other tertiary-amine encompassed by component (ii) is 3-dimethylamino-N,N-dimethylpropionamide.

41. A method as defined in claim 40 in which said catalyst system additionally contains an organic compound of tin.

42. A method as defined in claim 30 in which the blowing agent is fluorocarbon.

43. A method as defined in claim 30 in which the blowing agent additionally contains water.

44. A method as defined in claim 30 in which said organic polyisocyanate comprises a polymeric isocyanate.

45. A method as defined in claim 30 in which said organic polyisocyanate comprises tolylene diisocyanate residue obtained from the manufacture of the 2,4- and 2,6-isomers of tolylene diisocyanate.

46. A method as defined in claim 30 in which said polyether polyol is a nitrogen-containing polyether polyol.

47. A method for producing semi-flexible polyurethane foam which comprises reacting and foaming a reaction mixture containing (1) an organic polyisocyanate; (2) an organic polyol reactant which is constituted of (a) from about 50 to 100 percent by weight of a polymer/polyether polyol produced by the in situ polymerization of an ethylenically unsaturated monomer in a polyether polyol and (b) from zero up to about 50 percent by weight of a polyether polyol having an average hydroxyl functionality from 2.1 to about 5, a hydroxyl number from about 18 to about 40 and an average primary hydroxyl content between about 35 and about 85 mole percent; (3) a blowing agent; and (4) from about 0.1 to about 10 parts by weight per one hundred parts by weight of total polyol reactant contained in the reaction mixture, of a catalyst system comprising from about 10 to about 90 weight percent of component (i) and from about 90 to about 10 weight percent of component (ii), said weight percentages being based on the combined total weight of components (i) and (ii) contained in the reaction mixture, where component (i) is at least one of 2-(2-dimethylaminoethoxy)ethanol and 2-[2-(2-dimethylaminoethoxy)ethoxy]ethanol, and component (ii) is at least one other tertiary-amine different from component (i).

48. A method as defined in claim 47 in which said catalyst system additionally contains an organic compound of tin.

49. A method for producing high-resilience polyurethane foam which comprises reacting and foaming a reaction mixture containing (1) an organic polyisocyante; (2) an organic polyol reactant which is constituted of (a) from about 20 to about 60 weight percent of a polymer/polyether polyol produced by the in situ polymerization of an ethylenically unsaturated monomer in a polyether polyol and (b) from about 80 to about 40 weight percent of a polyether polyol having an average hydroxyl functionality from 2.1 to about 5, a hydroxyl number from 18 to about 40 and an average primary hydroxyl content between about 35 and about 85 mole percent; (3) a blowing agent; and (4) from about 0.05 to about 4 parts by weight per one hundred parts by weight of total organic polyol contained in the reaction mixture, of a catalyst system comprising from about 10 to about 90 weight percent of component (i) and from about 90 to about 10 weight percent of component (ii), said weight percentages being based on the combined total weight of components (i) and (ii) contained in the reaction mixture, where component (i) is at least one of 2-(2-dimethylaminoethoxy)ethanol and 2-[2-(2-dimethylaminoethoxy)ethoxy]ethanol, and component (ii) is at least one other tertiaryamine different from component (i).

50. A method as defined in claim 49 in which said catalyst system additionally contains an organic compound of tin.

* * * * *

UNITED STATES PATENT OFFICE
CERTIFICATE OF CORRECTION

Patent No. 4,049,931    Dated September 20, 1977

Inventor(s) Michael Ray Sandner and Robert Donovan Duffy

It is certified that error appears in the above-identified patent and that said Letters Patent are hereby corrected as shown below:

Column 2, line 6, for "ad" read -- and --. Column 3, line 48, for "grouos" read -- groups --. Column 4, line 50, for "system" read -- systems --; line 65, for "-pentaalkylidiethylenetria-" read -- -pentaalkyldiethylenetria- --; line 66, for "N',N-" read -- N',N'- --. Column 5, line 12, for "dibutylin" read -- dibutyltin --. Column 6, line 39, for "," read -- . --; line 51, for "reaction" read -- reactions --. Column 7, lines 1-5, after "+" for "N" read -- n --; line 29, after "in" read -- a --; line 45, for "while" read -- which --. Column 9, line 28, for "dimetnylamine" read -- dimethylamine --. Column 12, line 2, for "(2-hydroxypropoxylme-" read -- (2-hydroxypropoxy)me- --; line 21, for "herinbelow" read -- hereinbelow --. Column 18, line 11, for "with" read -- within --; line 25, for "azetrope" read -- azeotrope --; line 58, that portion of the formula reading $-CH_2CH_2]m$ should read $-CH_2CH_2]_m$ Column 19, line 18, for "tetiary" read -- tertiary --. Column 22, line 18, for ", -60°" read -- and above -60°F. --. Column 24, line 3, after "pigments" read -- , --. Column 25, line 18, before "inches" read -- 12 --; line 56, for "178" read -- 1/2- --. Column 26, Table I, in the second line of footnote 1, that portion of the formula reading $Me_2SiO(Me_2$ should read $Me_3SiO(Me_2$ Column 29, line 65, for "DMEE-R" read -- DMEEE-R --. Column 30, line 10, for "DMEE-R" read -- DMEEE-R --; line 25, for "amne" read -- amine --; line 32, for "give" read -- given --.

UNITED STATES PATENT OFFICE
CERTIFICATE OF CORRECTION

Patent No. 4,049,931                Dated September 20, 1977

Inventor(s) Michael Ray Sandner and Robert Donovan Duffy

It is certified that error appears in the above-identified patent and that said Letters Patent are hereby corrected as shown below:

Column 31, line 1, for "this" read -- the --; line 8, for "exampls" read -- examples --; line 15, for "(DMETA)" read -- (DMEA) --. Column 32, line 33, for "aand" read -- and --; line 35, for "preparation" read -- preparations --. Column 34, line 33, for "give" read -- given --. Column 35, line 40, for "hole" read -- sole --. Column 37, Table XVII, in the seventh line of the left-hand legends, for "DMEA$^3$" read -- DMEE$^3$ --; Table XVII, in the next to last of the left-hand legends, for "lbs. cu. ft." read -- lbs./cu. ft. --; line 30, for "TAble" read -- Table --. Column 38, line 15, for "2-([2-" read -- 2-[2- --; line 26, for "form" read -- foam --; line 41, for "e" read -- E --; Table XIX, opposite the left-hand legend reading "Foam Formulation", delete "F1" and "E$^2$" and, under columns headed "C-38" and "59", in each instance, read -- F$^1$ -- and, under columns headed "C-39", "C-40", "60" and "61", in each instance, read -- E$^2$ --. Column 39, line 14, for "prformance" read -- performance --. Column 40, Table XXII, opposite the left-hand legend reading "Tack-free time" and under the last column headed "74", for "70" read -- 80 --. Column 41, line 26, for "XI" read -- IX --. Column 42, line 13, for "("DDPS")" read -- ("DDPA") --. Column 43, Table XXV, opposite the left-hand legend reading "Run No.", the heading of the third column reading "c-54" should read -- C-54 --; line 66, for "herinabove" read -- hereinabove --. Column 44, line 39, for "repeates" read -- repeats --; line 40, for "XXVI" read -- XXIV --; Table XXVII, opposite the left-hand legend reading "Foam Formulation", under columns headed "C-51", "85", "87" and "88", in each instance, read -- F$^1$ -- and, under columns headed "C-55" and "90", in each instance, read -- E$^2$ --; line 60, for "thay" read -- that -- and for "Xv" read -- XV --.

UNITED STATES PATENT OFFICE
CERTIFICATE OF CORRECTION

Patent No. 4,049,931  Dated September 20, 1977

Inventor(s) Michael Ray Sandner and Robert Donovan Duffy

It is certified that error appears in the above-identified patent and that said Letters Patent are hereby corrected as shown below:

Column 45, line 36, for "(DNEEE)" read -- (DMEEE) --.
Columns 47-48, Table XXXII, in the twelfth line of left-hand legends, for "timme" read -- time --. Column 47, line 54, for "1.00" read -- 1.0 --; line 59, for "he" read -- the --; line 67, before "C" read -- and --. Column 50, line 68, for "in" read -- on --. Column 55, line 47, for "pf" read -- of --. Column 56, Table XLII, under column headed "C-77", for the last entry reading "95+", read -- 98+ --. Column 58, line 27, for "forming" read -- foaming --.

Signed and Sealed this

Twenty-fifth Day of April 1978

[SEAL]

Attest:

RUTH C. MASON  
Attesting Officer

LUTRELLE F. PARKER  
Acting Commissioner of Patents and Trademarks